United States Patent [19]

Umemoto et al.

[11] Patent Number: 5,727,107
[45] Date of Patent: Mar. 10, 1998

[54] LIGHT GUIDE PLATE, SURFACE LIGHT SOURCE DEVICE, POLARIZED LIGHT SOURCE DEVICE AND LIQUID CRYSTAL DISPLAY

[75] Inventors: Seiji Umemoto; Kazutaka Hara; Hiroyuki Yoshimi; Tatsuya Osuka; Tadayuki Kameyama, all of Osaka, Japan

[73] Assignee: Nitto Denko Corporation, Osaka, Japan

[21] Appl. No.: 691,370

[22] Filed: Aug. 2, 1996

[30] Foreign Application Priority Data

| Aug. 3, 1995 | [JP] | Japan | 7-218046 |
| Nov. 14, 1995 | [JP] | Japan | 7-321036 |

[51] Int. Cl.$^6$ .................................. G02B 6/06
[52] U.S. Cl. .................................. 385/116
[58] Field of Search ............... 250/226, 559.22, 250/559.31, 341.1, 225, 341.3, 338.1, 227.17, 222.2, 222.1; 356/432, 355, 356, 363, 376, 345, 351, 369; 359/12, 30, 35, 228, 250, 251; 362/297, 346, 31, 245, 26; 349/65, 98, 102, 117; 372/20, 22, 28, 29; 385/146, 147, 901

[56] References Cited

U.S. PATENT DOCUMENTS

| 4,027,949 | 6/1977 | Lobb | 359/250 |
| 4,129,781 | 12/1978 | Doyle | 250/341.3 |
| 4,668,860 | 5/1987 | Anthon | 250/225 |
| 4,701,028 | 10/1987 | Clerc et al. | 349/98 |
| 5,029,045 | 7/1991 | Sanai et al. | 362/26 |
| 5,084,808 | 1/1992 | Endo et al. | 362/297 |
| 5,239,183 | 8/1993 | Kouno et al. | 250/559.31 |
| 5,485,271 | 1/1996 | Drevillon et al. | 250/341.1 |
| 5,490,158 | 2/1996 | Mogi | 372/36 |
| 5,536,936 | 7/1996 | Drevillon et al. | 250/226 |

*Primary Examiner*—Akm E. Ullah
*Attorney, Agent, or Firm*—Sughrue, Mion, Zinn, Macpeak & Seas, PLLC

[57] ABSTRACT

A light guide plate comprises: an outgoing radiation plane; a bottom opposed to the outgoing radiation plane; and an incidence plane disposed between the outgoing radiation plane and the bottom; wherein projections or recesses are formed on the bottom along the progress direction of incident light at a regular interval, the projections or recesses have long-side and short-side faces, an projection area of the long-side face on the outgoing radiation plane is three times or more that of the short-side face on the outgoing radiation plane, the long-side face is a projection, the long-side face is placed on the incidence plane side in the case of projections, the long-side face is placed on a side opposed to the incidence plane in the case of recesses.

29 Claims, 4 Drawing Sheets

LIGHT GUIDE PLATE, SURFACE LIGHT SOURCE DEVICE, POLARIZED LIGHT SOURCE DEVICE AND LIQUID CRYSTAL DISPLAY

FIELD OF THE INVENTION

This invention relates to a light guide plate excellent in use efficiency of light, a surface light source device and a polarized light source device using it, and a liquid crystal display excellent in brightness using them.

DESCRIPTION OF THE PRIOR ART

An illumination system excellent in use efficiency of light that can be used with liquid crystal displays (LCDs), etc., is demanded. A polarizing plate used with TN (twisted nematic) LCDs, STN (super twisted nematic) LCDs, etc., absorbs about 60% of the light amount of natural light for conversion to heat, etc., and normally has use efficiency of light in the range of 35% to 45%, which theoretically is not more than 50%; an improvement in an illumination system is required to enhance brightness. Thus, an attempt has been made to develop an illumination system that can enhance brightness while enhancing use efficiency of light by supplying light to the polarizing plate as polarized light.

As the conventional illumination system that can supply light as polarized light, a system disclosed in Japanese Patent Publication No. Hei. 7-36032 is known, wherein a reflection layer of diffusion or dispersion type is made to adhere to the bottom of a light guide plate of side light type for allowing light to be incident from the side face and go out through the top face and polarized light separation means comprising cholesteric liquid crystal phase on the top face is provided. This system separates incident light into left circularly polarized light and right circularly polarized light as transmitted light and reflected light through the polarized light separation means and reflects the reflected light via the reflection layer on the bottom to allow the light to again go out, thereby allowing the incident light to go out as circularly polarized light for enhancing use efficiency of light.

In the system, the dot-like reflection layer of diffusion or dispersion type on the bottom is provided to irregularly reflect incident light by multiple reflection or refraction and allow it to go out to the top face because a flat face would fully reflect incident light from the side face of the light guide plate and have a poor capability of allowing the light to go out to the top face. In this case, however, the diffusion type reflection layer is random in directions of outgoing light and is poor in the amount of light that can be used effectively. Also, circularly polarized light reflected through the polarized light separation means and again incident is diffusely reflected on the reflection layer, takes random light paths, is released in the polarized light state, and is hard to be used as again outgoing light through the top face; the reflected light component through the polarized light separation means becomes an outgoing radiation loss.

On the other hand, on the dispersion type reflection layer, the polarized light state of circularly polarized light again incident through the polarized light separation means is maintained to a certain degree by suppression of irregular reflection, but the capability of allowing incident light from the side face of the light guide plate to go out to the top face deteriorates. If dispersion efficiency of incident light is enhanced for improving outgoing radiation efficiency, reincident light through the polarized light separation means is dispersed largely in a lateral direction and the amount of light again going out to the top face deteriorates. In fact, the main outgoing radiation direction is a direction inclined 60 to 70 degrees to the outgoing radiation plane, thus the reincident light through the polarized light separation means cannot substantially be used and it is difficult to improve the outgoing radiation efficiency.

For the outgoing radiation direction, it is proposed to place a prism sheet on the outgoing radiation plane of a light guide plate and make the outgoing radiation direction perpendicular to the outgoing radiation plane. However, it functions as a layer largely changing the progress direction of reincident light in the reincidence system through the polarized light separation means; the outgoing radiation efficiency deteriorates and it is difficult to improve the light use efficiency. Further, a light guide plate adopting a prism structure on the bottom and formed with a wedge on the incidence plane of light for putting outgoing light into parallel light is also proposed in U.S. Pat. No. 5,359,691. However, in the reincidence system through the polarized light separation means, light is hard to be incident on a slope positioned on the incident side of light even through the prism layer on the bottom and a poor improvement effect of outgoing radiation efficiency through reflection is produced. Also, the light guide plate is poor in effectiveness of allowing light to go out in a direction perpendicular to the outgoing radiation plane and efficiency of controlling the outgoing light to parallel light; generally it is poor in use efficiency of light. Light going out in a direction perpendicular to the outgoing radiation plane or in a close direction thereto is easily used as effective light.

On the other hand, a polarized light source device comprising a light source having a reflection mirror and natural light and polarized light separation means of cholesteric liquid crystal phase type without using a light guide plate is also proposed in Japanese Patent Publication No. Hei. 3-45906. However, to adopt a structure for putting outgoing light into parallel light, when reincident light through the polarized light separation means is reflected on the reflection mirror and takes an again outgoing light path, it is absorbed on the light source and a poor improvement effect of light use efficiency is produced. Thus, a method of placing a diffusion plate between the reflection mirror and the polarized light separation means is also proposed in Japanese Patent Publication No. Hei. 6-324333. However, the light path of outgoing light disperses through the diffusion plate, the amount of light that can be used effectively decreases, the absorption loss caused by the diffusion plate also increases, and the polarized light state is also released because of diffusion of reincident light; the improvement effect of light use efficiency is not large.

To separate incident light into transmitted light and reflected light through the polarized light separation means, allow the reflected light to be again incident on the light guide plate, and allow the light to again go out through reflection for polarizing the light as described above, the conventional dispersion reflection type light guide plate is poor in the outgoing light amount in the perpendicular direction and the separation efficiency through the polarized light separation means and is hard to improve light use efficiency. With the light guide plate of the bottom prism structure, if the bottom structure is adjusted so that the initial outgoing radiation becomes in a direction perpendicular to the outgoing radiation plane, reincident light through the polarized light separation means is restored perpendicularly, becomes stray light through the bottom structure, and is hard to again go out; reuse efficiency is poor and the component in the perpendicular direction to the outgoing radiation plane is small in the again outgoing component.

The point in the light guide plate of the bottom prism structure described above is also applied when the initial outgoing radiation is not in the perpendicular direction. Therefore, generally the amount of light that can be reused effectively is poor. Further, usually the reincident light is restored to the outgoing radiation plane twice through total reflection on the prism face. In this case, if the light guide plate is made of resin, the polarized light conversion efficiency reduces to 45% or less. A light guide plate of a structure wherein with the bottom of a prism structure, the thickness is decreased gradually from the incidence plane and the outgoing radiation plane is formed of a slope and a flat face parallel to the outgoing radiation plane is also proposed in U.S. Pat. No. 5,050,964. However, outgoing light cannot be put into parallel light and reincident light through polarized light separation means is also poor in reuse efficiency because of diffusion reflection, etc.

SUMMARY OF THE INVENTION

It is an object of the invention to develop a light guide plate capable of efficiently transmitting incident light and allowing it to go out from an outgoing radiation plane in good perpendicularity and parallel light property and also allowing reincident light through polarized light separation means to go out in a state in which a loss of dispersion, etc., is small and in good directional conformity with initial outgoing light so that it is excellent in use efficiency of light that can be effectively reused.

According to the present invention, there is provided a light guide plate comprising: an outgoing radiation plane; a bottom opposed to the outgoing radiation plane; and an incidence plane disposed between the outgoing radiation plane and the bottom; wherein projections or recesses are formed on the bottom along the progress direction of incident light at a regular interval, the projections or recesses have long-side and short-side faces, an projection area of the long-side face on the outgoing radiation plane is three times or more that of the short-side face on the outgoing radiation plane, the long-side face is a projection, the long-side face is placed on the incidence plane side in the case of projections, the long-side face is placed on a side opposed to the incidence plane in the case of recesses.

According to the invention, there can be provided a light guide plate capable of allowing incident transmission light from the side face of the light guide plate to go out at right or substantial right angles by controlling the outgoing radiation direction via short-side faces for efficiently transmitting incident light and efficiently forming outgoing light excellent in perpendicularity and parallel light property and therefore in a direction effective for improving viewability of a liquid crystal display, etc. Also, there can be provided a thin light guide plate of practical size excellent in in-face uniformity of outgoing light and less inconsistent in light and shade that can be easily applied to a liquid crystal display, etc.

Therefore, the light guide plate can be used to form a bright surface light source device or polarized light source device excellent in light use efficiency for allowing parallel light to go out in a direction effective for visual recognition. Also, it can be used to form a bright and easy-to-view liquid crystal display consuming low power. Particularly, if the light guide plate and the polarized light separation means are used in combination to form a polarized light source device, reincident light through the polarized light separation means based on outgoing light excellent in perpendicularity and parallel light property can also be allowed to again go out in a state in which a loss of dispersion, etc., and angle change are small and in good directional conformity with initial outgoing light; light that can be used effectively as polarized light can be provided with use efficiency of incident transmission light.

DETAILED DESCRIPTION OF THE PREFERRED EMBODIMENTS

Figure 1:
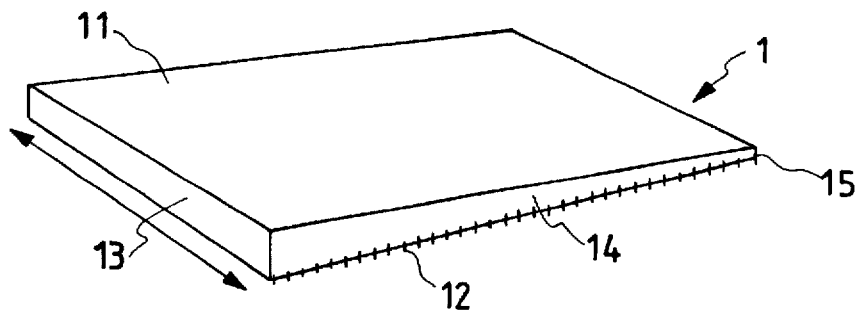
FIG. 1 is a perspective view of one embodiment of a light guide plate.

A light guide plate of the invention is made of a plate-like substance having an outgoing radiation plane, a bottom opposed thereto, and an incidence plane comprising a side end face between the outgoing radiation plane and the bottom. The bottom of the light guide is provided with projections or recesses at a regular interval, which are formed of slopes parallel to the longitudinal direction of the incidence plane. The projections or recesses have long-side and short-side faces based on a line connecting the intersection with the bottom and the vertex thereof. The projection area of the long-side face on the outgoing radiation plane is three times or more that of the short-side face on the outgoing radiation plane. If the long-side face is in a projection, it is placed on the incidence plane side; if the long-side face is in a recess, it is placed on the side end side opposed to the incidence plane.

FIGS. 1 to 4 show light guide plate examples according to the invention. FIGS. 5(a) to 5(d) and 6(a) to 6(d) show projection and recess examples on the bottom respectively. In FIGS. 1 to 4, numeral 11 is an outgoing radiation plane, numerals 12, 16, 17, and 18 are bottoms, numeral 13 is an incidence plane, numeral 14 is a side face, and numeral 15 is a side end opposed to the incidence plane 13. In FIGS. 5 and 6, numerals 21, 22, 23, and 24 are projections, numerals 25, 26, 27, and 28 are recesses, numerals 31, 33, 35, 37, 42, 44, 46, and 48 are slopes forming long-side faces, and numerals 32, 34, 36, 38, 41, 43, 45, and 47 are slopes forming short-side faces.

Figure 2:
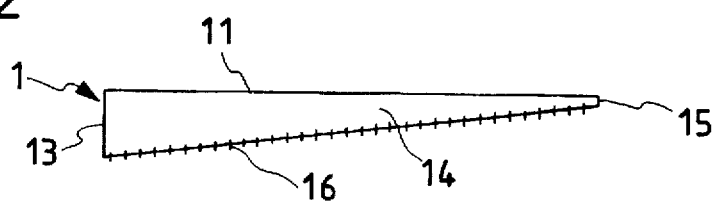
FIG. 2 is a side view of another embodiment of the light guide plate.

The light guide plate of the invention is made of a plate-like substance having an outgoing radiation plane, a bottom opposed thereto, and an incidence plane comprising a side end face between the outgoing radiation plane and the bottom. The plate-like substance is not limited, but preferably the side end opposed to the incidence plane is thinner than the incidence plane (especially the thickness of the former is 50% or less of that of the latter), as shown in the FIGS. Thinning of the opposed side end to the incidence plane has the advantage that light incident from the incidence plane (heavy arrow in FIGS. 5(a) to 5(d) and 6(a) to 6(d)) can be efficiently incident on the short-side faces on the bottom by the time it arrives at the opposed side end as the transmission end, and can be reflected and go out through the outgoing radiation plane for efficient supply to the target plane. Such a thinned structure enables the light guide plate to become lightweight; for example, if the bottom is a line face as shown in FIG. 2, the weight of the light guide plate can be reduced to about 75% of that of a uniformly thick light guide plate.

The bottom of the plate-like substance is defined between the lower edge of the side end side opposed to the incidence plane and the lower edge of the incidence plane. The bottom has projections or recesses at regular intervals which are formed of slopes parallel to the longitudinal direction of the incidence plane. That is, for example, based on FIGS. 1, 5(a) and 6(a), the bottom has the projections 21 each comprising the slopes 31 and 32 or the recesses 25 each comprising the slopes 41 and 42 at regular intervals in the direction along the incidence plane 13 as indicated by the arrow shown in FIG. 1.

Based on the line connecting the intersections of the slopes forming the projections or recesses and the bottom, the projection or recess depends on whether the intersections (vertexes) of the slopes of the projection or recess and the bottom are projected from or recessed in the line. That is, based on the illustrations in FIGS. 5(a) to 5(d) and 6(a) to 6(d), the projection or recess depends on whether the intersections (vertexes) of the slopes of the projection or recess and the bottom are projected from or recessed in the line 20 indicated by a phantom line connecting the intersections of the slopes (31 and 32, 33 and 34, 35 and 36, 37 and 38, 41 and 42, 43 and 44, 45 and 46, 47 and 48) forming the projections (21, 22, 23, 24) or recesses (25, 26, 27, 28) and the bottom.

The slopes forming the projection or recess comprise long-side and short-side faces based on the line connecting the intersection with the bottom and the vertex. The projection area of the long-side face on the outgoing radiation plane is three times or more that of the short-side face on the outgoing radiation plane. If in the case of the projection, the long-side face is placed on the incidence plane side; if in the case of the recess, the long-side face is placed on the side end side opposed to the incidence plane.

Figure 5A:
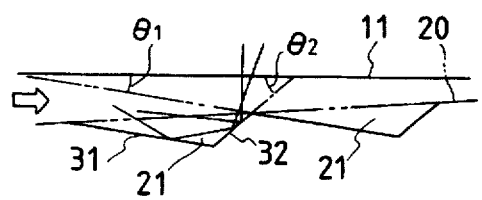
FIGS. 5(a) to 5(d) are side views of projections formed on a bottom of the light guide plate.
Figure 5B:
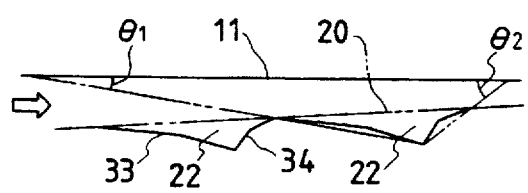
Figure 5C:
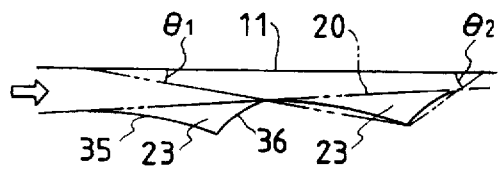
Figure 5D:
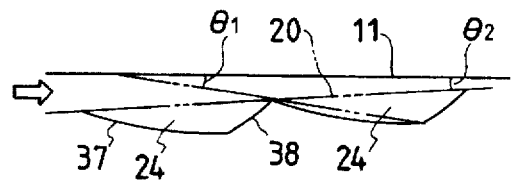
Figure 6A:
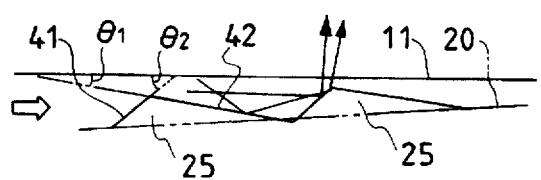
FIGS. 6(a) to 6(d) are side views of recesses formed on a bottom of the light guide plate.
Figure 6B:
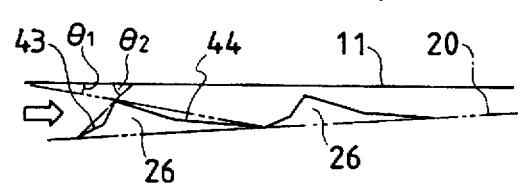
Figure 6C:
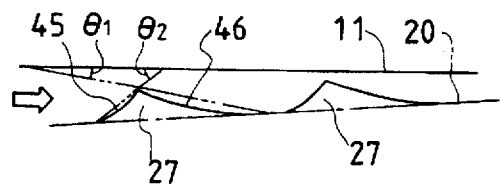
Figure 6D:
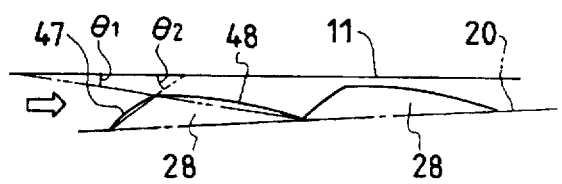

That is, for example, based on FIGS. 1, 5(a) and 6(a), the slopes 31 and 32 forming the projection 21 comprise the long-side face 31 and the short-side face 32 or the slopes 41 and 42 forming the recess 25 comprise the long-side face 42 and the short-side face 41 based on the line (equivalent to the phantom line in FIGS. 5(b) to 5(d) and 6(b) to 6(d)) connecting the intersections with the bottom (equivalent to the phantom line 20) and the vertexes. The projection area of the long-side face 31, 42 on the outgoing radiation plane 11 is three times or more that of the short-side face 32, 41 on the outgoing radiation plane 11. For the projection 21, its long-side face 31 is placed on the incidence plane 13 side; for the recess 25, its long-side face 42 is placed on the side end side 15 opposed to the incidence plane.

In addition to transmission light incident directly on the short-side faces, transmission light incident on the long-side faces and reflected therefrom and incident on the short-side faces can also be supplied to the outgoing radiation plane through reflection on the short-side faces, thus improving light use efficiency. The long-side face is a functioning portion for allowing reincident light reflected by polarized light separation means to again go out when the light guide plate is used with a polarized light source device. From this point, the preferred projection area of the long-side face on the outgoing radiation plane is five times or more and in particular 10 to 100 times that of the short-side face on the outgoing radiation plane.

Figure 3:
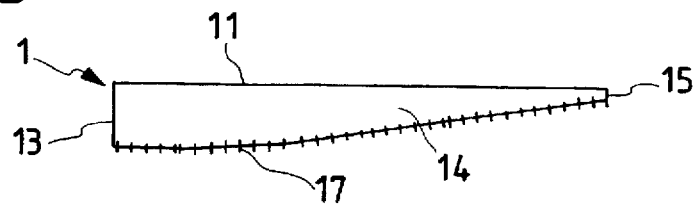
FIG. 3 is a side view of still another embodiment of the light guide plate.
Figure 4:
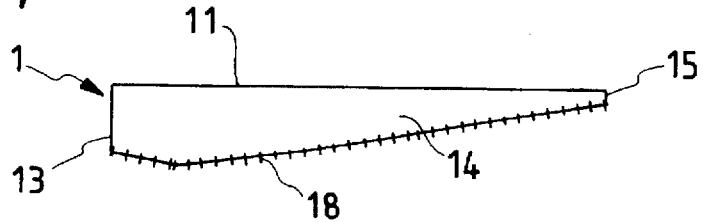
FIG. 4 is a side view of still another embodiment of the light guide plate.

In the invention, the shape of the bottom of the light guide plate can be determined as necessary. Preferably, as a slope face, the opposed side end to the incidence plane is thinner than the incidence plane. In this case, the shape of the slope face may be determined as desired; it can be made any necessary face shape such as a line face as shown in FIG. 2 or a curved face as shown in FIGS. 3 and 4. If it is not a line face, preferably it is in the range within five degrees from the average tilt angle at all positions on the bottom from the view of evening outgoing radiation directions of outgoing light from the outgoing radiation plane.

The shape of each projection or recess made in the bottom need not be formed as linear slopes as shown in FIGS. 5 (a) to (d) and 6 (a) to (d), and may be formed as slopes containing a refractive face, a bent face, etc. The projections or recesses need not be the same in shape, etc., on the entire bottom and preferably are of a structure wherein the shape and angle change gradually from the incidence side from the view of providing outgoing light excellent in perpendicularity.

Since outgoing light is emitted like stripes via the projections or recesses on the bottom, preferably the projections or recesses are small as much as possible, and if they are placed at large intervals, inconsistency in light and shade is caused, easily deteriorating uniformity in brightness on the entire face. The preferred projection or recess intervals are 500 μm or less, especially 400 μm or less, particularly 5 to 300 μm from the point of preventing inconsistency in light and shade for providing an outgoing radiation plane excellent in uniformity in brightness. If the intervals are less than 5 μm, large dispersion is produced due to diffraction and the light guide plate is not suitable for a back light of a liquid crystal display.

Preferably, the long-side face as the slope forming a part of the projection or recess has the tilt angle to the outgoing radiation plane 11, θ1, in the range of 0 to 10 degrees, especially 5 degrees or less, particularly 2 degrees or less, as shown in FIGS. 5(a) to 5(d) and 6(a) to 6(d). By placing the tilt angle in such a range, as indicated by broken line arrows in FIGS. 5(a) and 6(a), light transmitted at an angle larger than the tilt angle is incident on the long-side face 31, 42 and reflected. At this time, based on the tilt angle of the long-side face, the light is reflected at more parallel angle with the outgoing radiation plane 11, is incident on the short-side face 32, 41, is reflected, and goes out through the outgoing radiation plane 11.

Resultantly, the incident angle of light on the short-side face can be made constant, variations in the incident angle can be suppressed, and outgoing light can be put into parallel light. Therefore, the tilt angles of the long-side and short-side faces as the slopes forming the projection or recess are adjusted, whereby outgoing light can be provided with directivity, whereby light can be allowed to go out in a perpendicular direction to the outgoing radiation plane or at a close angle to the perpendicular direction.

In this connection, with a light guide plate made of acrylic resin, the maximum angle of transmitted light of light incident on the end face is 41.8 degrees based on the refractive index (about 1.5) and as the refractive index of the light guide plate increases, the maximum angle of transmitted light decreases. Thus, if the tilt angle of the long-side face exceeds 10 degrees, the percentage of the projection area of the long-side face on the outgoing radiation plane decreases and the percentage of transmission light whose outgoing radiation direction can be controlled through the long-side face lowers. Also, the reflection angle differences between transmission light incident on the short-side face via the long-side face and transmission light directly incident on the short-side face increase, controllability for putting outlight light into parallel light lowers, and outgoing light becomes poor in directivity. The tilt angle of the long-side face is preferably selected within a range of 0.01 to 10 degree, and more particularly within a range of 0.01 to 5 degree.

Therefore, in a structure wherein one slope for reflecting transmission light and supplying it to the outgoing radiation plane, which corresponds to the short-side face in the invention, is made large for increasing the projection area percentage of the slope on the outgoing radiation plane and accordingly the tilt angle of another slope (corresponding to the long-side face in the invention) is set to 20 degrees or more as with the conventional light guide plate, the incidence probability of transmission light on the slope is extremely small and outgoing light is hard to be put into parallel light and becomes difficult to be provided with perpendicular directivity.

On the other hand, preferably the short-side face as the slope forming a part of the projection or recess has the tilt angle to the outgoing radiation plane 11, 62, in the range of 25 to 50 degrees, especially 30 degrees or more, as shown in FIGS. 5(a) to 5(d) and 6(a) to 6(d). By placing the tilt angle in such a range, as indicated by broken line arrows in FIGS. 5(a) and 6(a), transmission light incident directly or via the long-side face can be reflected via the short-side face 32, 41 at right angles to the outgoing radiation plane 11 or at a close angle thereto and light in a direction for effectively improving viewability of a liquid crystal display, etc., can be allowed to go out efficiently. If the tilt angle of the short-side face is outside the above-mentioned range, the difference from the perpendicular direction increases, it is difficult to provide outgoing light with perpendicular directivity, and the outgoing radiation efficiency (use efficiency) of transmission light also deteriorates.

In the invention, the shape of the incidence plane of the light guide plate is not limited and may be determined as necessary. Generally, it is a plane perpendicular to the outgoing radiation plane; for example, the incidence plane can also be shaped like a bent recess in response to the outer peripheral surface of a light source for improving incidence efficiency. It can also take an incidence plane structure having a guide part placed between the light guide plate and a light source. The guide part can be shaped like a proper form in response to a light source, etc.

The shape of the outgoing radiation plane generally is a flat plane, etc., but the outgoing radiation plane can also take a structure having a diffusion layer for dispersion on the surface as required. However, to form a polarized light source device, preferably the light guide plate does not have a diffusion layer for dispersion on the bottom, the outgoing radiation plane, or in any other portion than the incidence plane containing an intermediate layer of the light guide plate from the view of use efficiency of light. Therefore, preferably the slopes forming the projections or recesses on the bottom and the outgoing radiation plane are smooth.

The light guide plate can be formed of a proper material showing transparency in response to the wavelength region of a light source. In this connection, in the visible light region, for example, acrylic resin like polymethyl methacrylate, polycarbonate resin like polycarbonate or a polycarbonate/polystyrene copolymer, or transparent resin like epoxy resin or the like, or glass, or the like are listed. To form a polarized light source device described later, preferably a light guide plate formed of a material showing no double refraction or having small double refraction is used.

Preferred manufacturing methods of light guide plates from the view of mass productivity, etc., include a method of charging or causing liquid resin that can be polymerized by heat, ultraviolet rays, radioactive rays, etc., to flow into a mold capable of forming a predetermined bottom shape for polymerization, a method of pressing thermoplastic resin against a metal mold capable of forming a predetermined bottom shape under heating for transferring the shape, a method of charging thermoplastic resin heated and melted or resin made a fluid by heating or via a solvent into a metal mold capable of forming a predetermined shape, and the like.

In the light guide plate of the invention, characteristics of an angle distribution, in-plane distribution, etc., of outgoing light can be adjusted based on control of the area ratio between the short-side and long-side faces, the tilt angles, the bottom shape, curvature, etc. In this connection, for a light guide plate with the refractive index 1.5, a slope face having no curvature as the bottom, and initial outgoing light going out perpendicularly, the tilt angle which the long-side face forms with the outgoing radiation plane is set to 6.6 degrees or less, whereby reincident light through the polarized light separation means can be allowed to go out with an angle change within 10 degrees. In this case, when the bottom has a curvature, the portion where the tilt angle becomes 6.6 degrees or less is provided in a percentage of the above-mentioned predetermined area or more, whereby the reincident light through the polarized light separation means can be allowed to go out with an angle change within 10 degrees.

In the invention, the light guide plate may be formed as a laminate of different materials, etc., for example, as a bottom formation sheet is bonded to the light guide section for transmitting light, and need not formed as an integral single-layer substance made of one material. The thickness of the light guide plate can be determined as necessary in response to the light guide plate size, the light source size, etc., according to use purposes.

The general thickness of the light guide plate used with a liquid crystal display, etc., is 20 mm or less, especially 0.1 to 10 mm, particularly 0.5 to 8 mm based on the incidence plane of the light guide plate. The general area ratio between the incidence plane and the outgoing radiation plane is 1/5 to 1/100, especially 1/10 to 1/80, particularly 1/15 to 1/50. In this connection, to allow parallel light to be incident from the incidence plane, short-side faces of integral thickness corresponding to the thickness of the incidence plane are formed, whereby all of incident light can be allowed to be incident on the short-side faces. In this case, if the tilt angle of the short-side face is set to 45 degrees and that of the long-side face is set to 0 degrees, the area ratio between the incidence plane and the outgoing radiation plane becomes about 1/30.

Assuming that the refractive index of the light guide plate is 1.5, the smaller the angle of incident transmission light within 41.8 degrees as mentioned above, the larger is the strength. Thus, if the area ratio between the short-side and long-side faces is about 1/15 based on the projection area on the outgoing radiation plane, most incident light can be allowed to be incident directly on the short-side faces not via the long-side faces and high outgoing radiation efficiency can be provided.

The light goes out in the direction of the normal to the outgoing radiation plane via the short-side faces with the tilt angle 45 degrees. Most of reincident light through the polarized light separation means is incident on the long-side faces. Resultantly, if the area ratio between the short-side and long-side faces is 1/5 based on the projection area on the outgoing radiation plane, ideally 83% of reincident light through the polarized light separation means can be incident on the long-side faces and reflected for use as again outgoing light intact.

Figure 7:
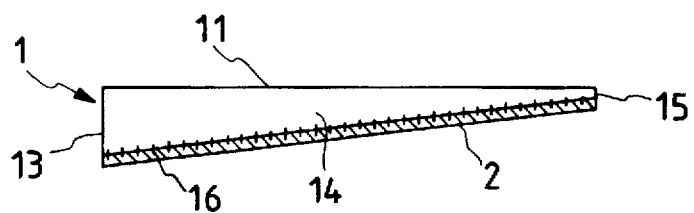
FIG. 7 is a side view of still another light guide plate.

The light guide plate can also be formed on the bottom with a reflection layer as required and preferably a metal reflection layer, an example of which is shown in FIG. 7, wherein numeral 2 is a reflection layer made of a metal layer. This reflection layer prevents light from leaking from the bottom and is effective for improving outgoing light efficiency. To use the light guide plate for a polarized light source device, the reflection layer also functions as polarized light conversion means.

To make the reflection layer function as polarized light conversion means, a metal reflection layer is particularly preferred. According to the metal reflection layer, the polarized light characteristic can be efficiently inverted at reflection time and the polarized light conversion efficiency is more excellent than that by total reflection or diffusion reflection via an interface different in refractive index. In this connection, if circularly polarized light incident on the metal face in a substantially perpendicular direction, the left and right conversion efficiency of circularly polarized light reaches a value near 100%; conversion efficiency of 90% or more is shown until about 30 degrees of incident angle.

A preferred metal reflection layer from the view of polarized light conversion efficiency is a layer having a metal face containing at least one of metals having a high reflection factor of aluminum, silver, gold, copper, or chromium. A metal reflection layer excellent in intimate contact with the bottom of the light guide plate can be formed as a metal powder mix application layer with binder resin or a metal thin film additional layer by an evaporation method, etc. The metal reflection layer can also be formed on one or both faces with a proper coat intended for improving the reflection factor, preventing oxidation, etc., as required.

The light guide plate according to the invention can be used to form various devices such as surface light source devices and polarized light source devices excellent in brightness by allowing highly collimated light to go out in a direction excellent in perpendicularity advantageous to visibility and efficiently using light from a light source and liquid crystal displays bright, easy-to-view, and excellent in low power consumption property.

Figure 8:
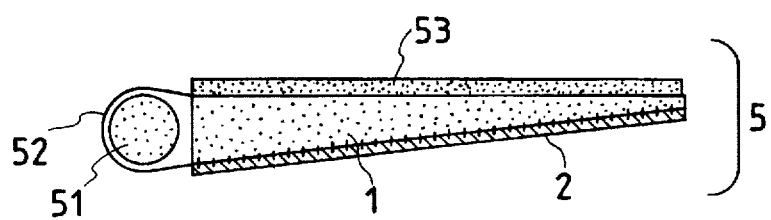
FIG. 8 is a sectional side view of one embodiment of a surface light source device.
Figure 9:
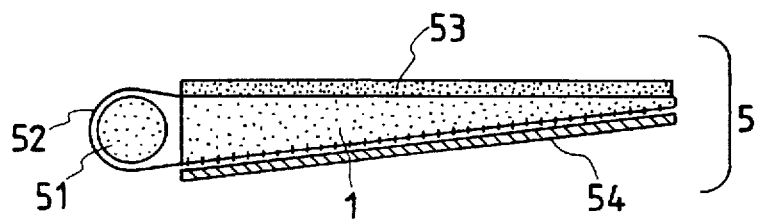
FIG. 9 is a sectional side view of another embodiment of the surface light source device.

FIGS. 8 and 9 show surface light source devices having a light guide plate according to the invention. In the drawings, numeral 1 is a light guide plate and numeral 5 is a surface light source device using it. The surface light source device has a light source 51 placed facing an incidence plane 13 of the light guide plate and can be used as a back light of side light type, etc. An appropriate device may be used as the light source; preferably a linear light source such as a (cold or hot) cathode tube, a point light source such as light emitting diodes, a linear or surface array thereof, or the like can be used. A cold cathode tube is particularly preferred from the view of low power consumption property, durability, etc.

To form a surface light source device, auxiliary means such as a reflection layer 2 on the light guide plate bottom, a light source holder 52 for surrounding a linear light source to guide light emitted from the light source into the side face of the light guide plate, a diffusion layer 53 placed on the outgoing radiation plane of the light guide plate for providing uniform surface emission, and a prism sheet for controlling the light outgoing direction can also be placed in combination as shown in the drawing as required.

As shown in FIG. 9, in place of or together with the reflection layer 2, a reflection plate 54 can also be disposed along the bottom of the light guide plate 1. The method of disposing the reflection plate on the bottom of the light guide plate has the advantage that if long-side faces are the same in tilt angle, the again outgoing radiation angle of reincident light through polarized light separation means can be made small. The reflection plate can be similar to the reflection layer described with the light guide plate; a reflection plate having a metal reflection surface can be preferably used with a polarized light source device. Therefore, a resin sheet with an additional metal thin film, metal foil, a metal plate, etc., can be used as the reflection plate. The surface of the reflection plate need not necessarily be specular and may be formed uniformly on the whole as small-angle multiple surfaces, a continuous curved surface, etc.

As a reflection plate, particularly a reflection plate used with a polarized light source device, etc., preferably the half angle of the half value width of spread of the reflection angle of reflected light when parallel light is allowed to be incident is within 10 degrees, especially within 5 degrees from the view of suppressing spread of again outgoing light. Therefore, a substance having a high reflection factor, less spread of the reflection angle, and producing no diffusion reelection can be used as the reflection plate. It may have asperities or a coarse surface made by rolling and slightly spread the reflection angle of reflected light. Generally, a resin sheet with an additional metal thin film having a high reflection factor, metal foil, or the like is used as the light source holder. To bond the light source holder to the end of the light guide plate with an adhesive, etc., formation of projections or recesses on the bottom can be omitted for the bond portion. The light source holder can also be extended to the bottom of the light guide plate for serving also as a reflection plate.

Placement of the diffusion layer is useful for preventing inconsistency in light and shade for forming an outgoing radiation plane more excellent in uniformity in brightness. The diffusion layer can be formed as a proper diffusion layer made of microscopic asperities, a diffusion plate, etc. However, as described above, to use the light guide plate with a polarized light source device, placement of the diffuse layer is not preferred.

A polarized light source device according to the invention is intended for converting incident light not showing a polarized light characteristic into polarized light with high efficiency together with polarized light separation means by transmission and reflection. For this purpose, the light guide plate according to the invention provides highly collimated outgoing light excellent in perpendicularity and can allow reincident light through polarized light separation means to again go out in good directional conformity with initial outgoing light in a less angle change state.

Figure 10:
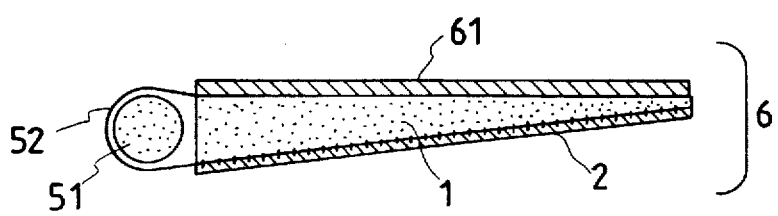
FIG. 10 is a sectional side view of one embodiment of a polarized light source device.
Figure 11:
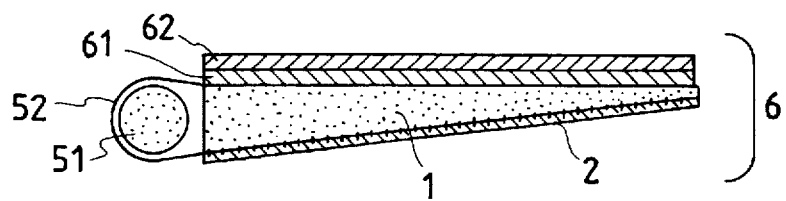
FIG. 11 is a sectional side view of another embodiment of the polarized light source device.

FIGS. 10 and 11 show polarized light source device embodiments according to the invention. The polarized light source device has polarized light separation means 61 by transmission and reflection placed above the outgoing radiation plane 11 of the light guide plate 1 in the surface light source device 5 described above. In the embodiment, the polarized light separation means 61 transmits predetermined circularly polarized light and reflects unpredetermined circularly polarized light and is placed just above the outgoing radiation plane 11 having no diffusion layer in the light guide plate 1. In FIG. 11, numeral 62 is linearly polarized light conversion means disposed on the top of the polarized light separation means 61.

According to the device, light going out from the outgoing radiation plane of the light guide plate 1 is incident on the polarized light separation means 61, which then transmits predetermined (in the example, left) circularly polarized light and reflects unpredetermined (in the example, right) circularly polarized light. The reflected light is again incident on the light guide plate as return light. The light again incident on the light guide plate is reflected on a reflection function portion made up of a reflection layer on the bottom, etc., and is again incident on the polarized light separation means, then is again separated into transmitted light and reflected light (rereincident light).

Therefore, reincident light as reflected light is enclosed between the polarized light separation means and the light guide plate and repeats reflection until it becomes predetermined circularly polarized light that can pass through the polarized light separation means. In this case, in the invention, preferably light goes out with the number of repetitions as small as possible, especially initial reincident light goes out without repeating reflection from the view of use efficiency of reincident light, etc.

Since the light guide plate according to the invention provides highly collimated outgoing light excellent in perpendicularity, most of reincident light through the polarized light separation means is incident on long-side faces and is reflected without largely changing the angle based on the moderate tilt angle of the long-side faces. The light can be allowed to again go out in a direction close to initial outgoing light and therefore with good perpendicularity with reflection with less angle change. Light excellent in directional conformity between initial outgoing light and again outgoing light and excellent in polarized light characteristic can be provided in a small loss state excellent in use efficiency.

If the light guide plate has a metal reflection face, reincident light is converted into predetermined circularly polarized light with high efficiency by means of the metal reflection face for reflection inversion and therefore light can be taken out efficiently. Outgoing light, which is excellent in perpendicularity, has the advantage of small light progress direction change caused by refraction on an interface different in refractive index.

With the conventional light guide plate described above, reincident light through the polarized light separation means is again incident on the polarized light separation means by dispersion reflection on the bottom (dots) or twice total reflection (prism). However, in the dispersion reflection system, outgoing light is poor in directivity and is again incident as dispersion light, thus conversion efficiency through the polarized light separation means cannot exceed 50% and a poor effect of enhancing the use efficiency of light is produced.

On the other hand, in the total reflection system described above, even if the light guide plate having the refractive index 1.5 is used, the conversion efficiency through the polarized light separation means for reincidence is 45% at the maximum, and largely deteriorates depending on the reflection angle by total reflection. If the incident angle exceeds a total reflection condition, reflection scarcely occurs, thus light does not again go out depending on the angle of reincident light through the polarized light separation means and reincident light cannot be used as again outgoing light; the effect of enhancing the use efficiency of light is hard to produce.

Further, if the bottom of the light guide plate is made a prism structure useful for reincident light to again go out to prevent reincident light from becoming unable to again go out, initial outgoing light deteriorates; in contrast, if the bottom is made a prism structure useful for initial outgoing radiation, the direction in which reincident light again goes out greatly changes from initial outgoing light and the conversion efficiency through the bottom of polarized light also deteriorates. It is hard to provide a prism structure enabling initial outgoing radiation to be well compatible with reincident light again going out. Also in this case, the effect of enhancing the use efficiency of light is hard to produce.

In addition, in either the dispersion reflection or total reflection system, it is hard to provide directivity for outgoing light through the polarized light separation means. The outgoing angle is also poor in perpendicularity. The outgoing light contains many outgoing light components largely shifting in angle from the perpendicular direction, for example, in a direction of 45 degrees or more with respect to the perpendicular direction, deteriorating viewability of a liquid crystal display, etc., and disadvantageous for display. Even if a prism sheet is placed on the outgoing radiation plane of the light guide plate for enhancing perpendicularity, light is incident on the reflection face of the light guide plate bottom at an angle largely shifting from the perpendicular direction, thus a poor effect of enhancing the use efficiency of light is produced.

As described above, with the conventional light guide plate, unlike the light guide plate of the invention, it is difficult to form highly collimated outgoing light excellent in perpendicularity through the light guide plate, separate the outgoing light into initial outgoing light and reincident light through the polarized light separation means, and allow the reincident light to again go out in good outgoing direction conformity with the initial outgoing light.

In the invention, the preferred light guide plate that can be used to form a part of a polarized light source device is a light guide plate for allowing incident light from the side face to go out from the outgoing radiation plane with high efficiency, the outgoing light showing high directivity, especially directivity excellent in perpendicularity to the outgoing radiation plane. Also, the light guide plate is excellent in again outgoing radiation efficiency of reincident light through the polarized light separation means, the directivity and outgoing radiation angle of the again outgoing light matching those of initial outgoing light as much as possible.

If outgoing radiation angle conformity is poor between again outgoing light and initial outgoing light and their outgoing radiation directions greatly differ, their luminance intensity cannot be increased and the effective use for improving the viewability of a liquid crystal display, etc., cannot be made; two peak intensities are shown in different directions in angle, deteriorating the viewability.

Figure 12A:
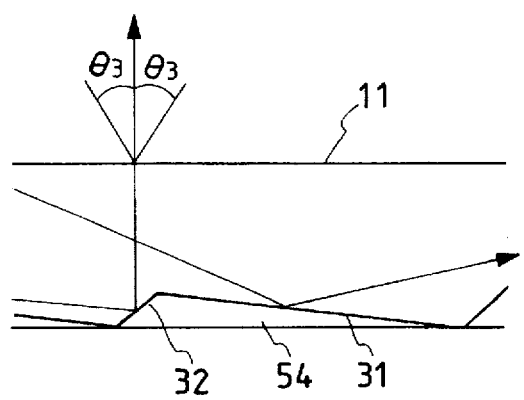
FIGS. 12(a) and 12(b) are side views of initial outgoing light and again outgoing light.

The preferred light guide plate from the above-mentioned point is a light guide plate for allowing incident light from the incidence plane to initially go out from outgoing radiation plane 11 mainly via short-side face 32, wherein the direction of the maximum luminous flux amount, θ3, is within the range of ±30 degrees, especially ±25 degrees, particularly ±20 degrees with respect to the direction of the normal to the outgoing radiation plane, as shown in FIG. 12(a), whereby light having the directivity of the direction useful for the viewability of a liquid crystal display can be provided as outgoing light.

Figure 12B:
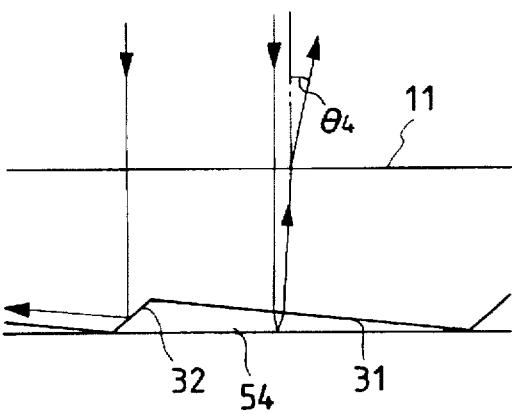

As shown in FIG. 12(b), if parallel light in the same direction as the direction in which light in the direction showing the maximum outgoing radiation amount of the initial outgoing light is reflected by a plane mirror placed in parallel on the outgoing radiation plane is allowed to be incident from the outgoing radiation plane, again outgoing light comprising return light of the incident light of the parallel light to the outgoing radiation plane is allowed to go out via long-side face 31, the half value width of the luminous flux angle of the initial outgoing light is within 60 degrees, especially within 45 degrees, particularly within 30 degrees, the angle shift between the direction of the maximum luminous flux amount of the again outgoing light and that of the initial outgoing light, θ4, is within 20 degrees, especially within 15 degrees, particularly within 10 degrees (peak luminance intensity conformity), and 67% or more, especially 75% or more, particularly 80% or more of the luminous flux amount of the again outgoing light is within cubic half angle 15 degrees relative to the direction of the maximum luminous flux amount of the initial outgoing light.

Thus, the peak intensity conformity between the initial outgoing light and again outgoing light according to the conformity of the maximum luminous flux amount directions is enhanced for improving the luminance intensity, and the peak luminance intensity angle difference is suppressed within the sum of the half value widths of the initial outgoing light and again outgoing light for preventing the two peak luminance intensities from occurring and widening the high intensity range. By setting the half value width, light having the directivity of the direction useful for the viewability of a liquid crystal display can be allowed to go out.

The angle shift is based on the direction of the maximum luminous flux amount, namely, the peak intensity; although slight spread of the angle of the luminous flux amount is allowed, the smaller angle is preferred. Further, the condition that about two-thirds or more of the luminous flux amount of again outgoing light exists within the cubic half angle 15 degrees is a condition for providing a high directivity match between initial outgoing light and again outgoing light for enabling bright viewability excellent in light amount; it is a condition hard to accomplish because of irregular reflection and large disturbance in optical paths in a light guide plate involving a dispersion layer or a diffusion layer.

The light guide plate having the above-mentioned characteristics can be provided by satisfying the conditions of the short-side and long-side faces on the bottom, etc. In this connection, assuming incident light parallel with a horizontal outgoing radiation plane, initial outgoing light can be allowed to go out in the direction of the normal to the outgoing radiation plane via a short-side face free of diffusion or attenuation with the tilt angle 45 degrees, and reincident light through the polarized light separation means can be allowed to go out in almost the same direction as initial outgoing light via a long-side face or a metal reflection plate substantially parallel with the outgoing radiation plane with no dispersion or large-angle refraction. In this case, the light guide plate has the area of the outgoing radiation plane about 30 times that of the incidence plane as described above, whereby the projection area of a long-side face on the outgoing radiation plane can be made about 30 times that of a short-side face on the outgoing radiation plane.

In the invention, like the above-mentioned means for separating light into left circularly polarized light and right circularly polarized light, proper means that can separate light into light different in polarized light characteristic through transmission and reflection can be used as polarized light separation means for forming a part of a polarized light source device. In the invention, a complete separation function is not required, but preferably polarized light in a different state contained in polarized light separated by transmission or reflection more lessens.

A sheet having a layer having a cholesteric liquid crystal phase, especially a layer made of a liquid crystal polymer showing a cholesteric phase, a sheet having the layer expanded on a glass plate, etc., a film made of a liquid crystal polymer showing a cholesteric phase, or the like can be listed as polarized light separation means that can be preferably used.

According to the cholesteric liquid crystal phase, left circularly polarized light and right circularly polarized light can be selectively separated into either one by transmission and reflection, and a liquid crystal phase in uniform orientation containing a cholesteric liquid crystal provides reflected light with no dispersion. The cholesteric liquid crystal phase has an optical characteristic small changing with visual angle change and is excellent in wideness of a viewing angle; it is appropriate particularly for forming a direct-view-type liquid crystal display, etc., also observed directly from a slanting direction.

The polarized light separation means can be formed as a single-layer substance or a laminate of two or more layers. Lamination is useful from the views of putting the separation function into a wide wavelength band, countering wavelength shift of slantingly incident light. In this case, preferably substances different in the center wavelength of light reflected as unpredetermined circularly polarized light are laminated in combination. That is, normally a single cholesteric liquid crystal layer is limited in a wavelength band showing selective reflective property (circular dichroism) and the limit may be a wide range extending over an about 100 nm wavelength band, but even the wavelength range does not extend over all band of visible light desired for application to a liquid crystal display, etc. In such a case, cholesteric liquid crystal layers different in selective reflective property can be laminated for enlarging the wavelength band showing the circular dichroism.

In this connection, cholesteric liquid crystal layers having the center wavelength of selective reflection based on the liquid crystal phase in the range of 300 to 900 nm and different 50 nm or more in the center wavelength of selective reflection are used in combination for reflecting circularly polarized light in the same polarizing direction and two to six types of cholesteric liquid crystal layers among them are laminated, whereby polarized light separation means that can cover a wide wavelength band of a visible light band, etc., can be formed efficiently. The laminate of a combination of cholesteric liquid crystal layers for reflecting circularly polarized light in the same polarizing direction is intended for aligning the phase state of circularly polarized light reflected on the layers for preventing the polarizing state from differing in wavelength band and increasing polarized light that can be used.

Therefore, preferably polarized light separation means is used wherein the wavelength band of light that can be reflected as unpredetermined circularly polarized light matches the wavelength band of outgoing light based on a light guide plate as much as possible. If the outgoing light contains the main wavelength of a bright-line spectrum, etc., matching the wavelength of reflected light based on cholesteric liquid crystal phase, etc., with one or more types of main wavelength provides better measures from the view of efficiency of polarized light separation, etc., and is also useful for thinning the polarized light separation means because of a decrease in the necessary number of laminated layers. In this case, preferably the wavelength match degree of reflected light is in the range within 20 nm each for one or more types of main wavelength light of light guide plate.

Proper cholesteric liquid crystal may be used and is not limited. Cholesteric liquid crystal molecules larger in phase difference provide a wider wavelength band of selective reflection and are preferably used from the views of decreasing the number of layers and a margin for wavelength shift at a large viewing angle. A liquid crystal polymer is preferably used from the views of weight, self-sufficiency, etc. In this connection, examples of liquid crystal polymers of a cholesteric liquid crystal include: a backbone chain type liquid crystal polymer such as polyester, etc.; a side-chain type liquid crystal polymer comprising an acrylic backbone chain, methacrylic backbone chain, siloxane backbone chain, etc.; a nematic liquid crystal polymer containing a low-molecular chiral agent; a chiral component introduced liquid crystal polymer; a mixed liquid crystal polymer of nematic and cholesteric; or the like. A liquid crystal polymer having glass transition temperature in the range of 30° to 150° C. is preferably used from the view of easy handling.

A cholesteric liquid crystal layer made of liquid crystal polymer can be formed by a method similar to conventional orientation process. As an example of the method, a liquid crystal polymer is expanded on a proper orientation film such as a layer resulting from forming a film of polyimide, polyvinyl alcohol or the like on a substrate and rubbing with a rayon cloth or the like; an orthorhombic evaporation layer of $SiO_2$; or the like, and they are heated at more than glass transfer temperature and less than isotropic phase transition temperature and cooled at less than glass transition temperature in a state in which the liquid crystal molecules are Grandjean texture for forming a glass state, then a fixed layer with the orientation fixed is formed.

For example, a proper glass plate or a proper film made of plastic such as triacetylcellulose, polyvinyl alcohol, polyimide, polyarylate, polyester, polycarbonate, polysulfone, polether sulfone, epoxy resin or the like can be used as the substrate. The fixed layer of the liquid crystal polymer formed on the substrate can be used as polarized light separation means intact as an integral substance with the substrate or can also be delaminated from the substrate for use as polarized light separation means made of a film, etc. To form as an integral substance with the substrate made of a film, preferably a film having a small phase difference as much as possible is used from the view of preventing state change in polarized light, etc. The polarized light separation means can also be disposed directly on the outgoing radiation plane of a light guide plate.

The liquid crystal polymer may be expanded by a heat-and-melting method or can also be expanded as a solution with a solvent. For example, methylene chloride and cyclohexanone, trichloroethylene and tetrachloroethane, N-methyl-pyrrolidone and tetrahydrofuran, etc., can be properly used as the solvent. The liquid crystal polymer may be expanded by a proper coating machine such as a bar coater, a spinner, a roll coater, or photogravure. At the time, a laminating method of cholesteric liquid crystal layers via an orientation film as required can also be adopted.

Preferably, the cholesteric liquid crystal layer is 0.5 to 100 μm, especially 1 to 70 μm, particularly 1 to 50 μm thick from the points of preventing orientation disturbance and transmission factor lowering, selective reflective property (wavelength range showing circular dichroism), etc. To form the cholesteric liquid crystal layer or polarized light separation means, various additive agents coprising a stabilizer, a plasticizer, metal, etc., can be blended as required.

The polarized light separation means used in the invention can be a proper form such as a cell form in which a cholesteric liquid crystallayer made of a low-molecular weight body is sandwiched between transparent materials of glass, films, etc., a form in which a cholesteric liquid crystal layer made of a liquid crystal polymer is supported on a transparent material, a form of a liquid crystal polymer film of a cholesteric liquid crystal layer, or a lamination made in proper combination of the forms. In this case, the cholesteric liquid crystal layer can also be held by a supporter of one or more layers in response to the strength, operability, etc., of the cholesteric liquid crystal layer. To use a support of two or more layers, preferably a film with no orientation or a substance having a small phase difference as much as possible like a triacetate film small in double refraction can be used from the view of preventing state change in polarized light, etc.

Preferably, the polarized light separation means is formed as a flat layer from the views of evening the separation performance, countering wavelength shift of slantingly incident light, etc. If the polarized light separation means is formed as a laminate, preferably each layer is also flat. To laminate cholesteric liquid crystal layers, use of liquid crystal polymers is particularly advantageous from the points of manufacturing efficiency, thinning the film, etc.

In the invention, if the linearly polarized light conversion means 62 is disposed on the top of the polarized light separation means 61 as shown in FIG. 11, circularly polarized light going out from the polarized light separation means is incident on the linearly polarized light conversion means 62 and undergoes phase change. In this case, light having a wavelength whose phase change corresponds to a quarter of the wavelength is converted into linearly polarized light and light of other wavelengths is converted into elliptically polarized light. This elliptically polarized light flattens out as it is close to the wavelength of the light converted into the linearly polarized light. Resultantly, light containing much the linearly polarized light component that can pass through the polarizing plate is allowed to go out from the linearly polarized light conversion means.

As described above, the linearly polarized light conversion means placed on the top of the polarized light separation means as required is intended for converting polarized light going out from the polarized light separation means into a state in which the linearly polarized light component is much contained. The polarized light is converted into a state in which the linearly polarized light component is much contained, whereby it can be made light easily passing through the polarizing plate. For example, if the polarizing plate is used with a liquid crystal display, it functions as an optical element for preventing change in the viewing angle for liquid crystal cells from lowering a polarized light characteristic for maintaining the display quality, an optical element for providing a higher polarization degree for accomplishing better display quality, or the like.

That is, the polarized light going out from the polarized light separation means can be allowed to be incident on liquid crystal cells intact for accomplishing display without using the polarizing plate, but the polarizing plate may be used as required because it can improve the display quality, etc., as described above.

The higher transmission factor for the polarizing plate is more advantageous to brightness of display, and the more contained the linearly polarized light component in a polarizing direction matching the polarization axis (transmission axis) of the polarizing plate, the higher is the transmission factor. For this purpose, the polarized light going out from the polarized light separation means is converted into predetermined linearly polarized light through the linearly polarized light conversion means.

In this connection, if natural light or circularly polarized light is allowed to be incident on a normal iodine family polarizing plate, the transmission factor is about 43%; if linearly polarized light is allowed to be incident with the polarization axis matched, a transmission factor exceeding 80% can be obtained. Therefore, use efficiency of light drastically improves and liquid crystal display excellent in brightness can be produced. The polarizing plate can also easily accomplish the polarization degree reaching 99.9%. The polarized light separation means alone is hard to accomplish such a high polarization degree, and particularly the polarization degree for slantingly incident light easily deteriorates.

As the linearly polarized light conversion means, proper means can be used in response to its polarized light characteristic. For circularly polarized light, a phase difference layer that can change the phase of the circularly polarized light can be preferably used. Preferably, the phase difference layer can form much linearly polarized light corresponding to the phase difference of a quarter of the wavelength from circularly polarized light going out from the polarized light conversion means and can convert light of other wavelengths into flat elliptically polarized light which has a long-diameter direction in a direction parallel with the linearly polarized light as much as possible and is close to the linearly polarized light as much as possible. The linearly polarized light conversion means can also be made integrally with the polarized light separation means or the polarizing plate of liquid crystal cells.

By using the phase difference layer as described above, it is placed so that the linearly polarized light direction of outgoing light from the phase difference layer and the long-diameter direction of elliptically polarized light become parallel with the transmission axis of the polarizing plate as much as possible, and light containing much the linearly polarized light component that can pass through the polarizing plate can be provided. Preferably, the phase difference layer can be formed of a proper material and gives a transparent and uniform phase difference. Generally, a phase difference plate is used to form the phase difference layer.

The phase difference given by the phase difference layer can be determined appropriately in response to the wavelength band of circularly polarized light allowed to go out from the polarized light separation means. In this connection, also considering the fact that most phase difference plates show wavelength dispersion of positive double refraction from their material characteristics from the views of the wavelength range, conversion efficiency, etc., in the visible light zone, phase difference layers giving a small phase difference, especially a phase difference of 100 to 200 nm, particularly 100 to 160 nm are often used preferably.

The phase difference plate can be formed as a layer or a laminate of two or more layers. For the phase difference plate made of one layer, preferably it is smaller in wavelength dispersion of double refraction because the polarized light state for each wavelength can be evened. On the other hand, lamination of layers to form a phase difference plate is effective for improving the wavelength characteristic in the wavelength band and their combination may be determined properly in response to the wavelength band, etc.

To form a phase difference plate of two or more layers for the visible light zone, preferably one or more layers for giving a phase difference of 100 to 200 nm as described above are contained as odd-numbered layers from the view of providing light much containing the linearly polarized light component. Preferably, other layers than those giving a phase difference of 100 to 200 nm are formed as those giving a phase difference of 200 to 400 nm from the view of improving the wavelength characteristic, etc., but not limited to it.

The phase difference plate can be obtained as a double refractive sheet, etc., comprising a film including polycarbonate, polysulfone, polyester, polymethyl methacrylate, polyamide, polyvinyl alcohol, etc., extended. Preferably, a phase difference error in the phase difference layer plane is smaller, especially ±10 nm or less from the view of maintaining the light emitting strength and color uniform at a wide viewing angle.

The phase difference set for a phase difference layer and the optical axis direction can be determined properly in response to the vibration direction of target linearly polarized light, etc. In this connection, with a phase difference layer giving a phase difference of 135 nm, linearly polarized light (wavelength 540 nm) with the vibration direction +45 or −45 degrees relative to the optical axis in response to the orientation of circularly polarized light is provided. If two or more phase difference layers are formed, particularly if a layer giving a phase difference of 100 to 200 nm occupies the outermost surface layer, setting to the placement angle based on the layer is preferred.

As we have discussed, the polarized light source device according to the invention reuses reflected light (reincident light) by the polarized light separation means as outgoing light resulting from polarized light conversion for preventing a reflection loss, etc., and converts the outgoing light into a light state containing a rich linearly polarized light component through the phase difference layer, etc., as required for easily passing through the polarizing plate for preventing an absorption loss, thereby improving light use efficiency. This system ideally can increase about double the light amount passing through the polarizing plate, but preferably the linearly polarized light component that can pass through the polarizing plate is contained 65% or more, especially 70% or more from the point of use as a light source.

The light guide plate and the surface light source device and the polarized light source device using the light guide plate according to the invention are excellent in use efficiency of light and provide light bright and excellent in perpendicularity as described above and are also easily put into a large area, etc., so that they can be applied preferably to various devices as a back light system, etc., in liquid crystal displays, etc. In this case, a diffusion plate, etc., that can maintain a polarized light state as much as possible can also be placed on the polarized light source device.

Figure 13:
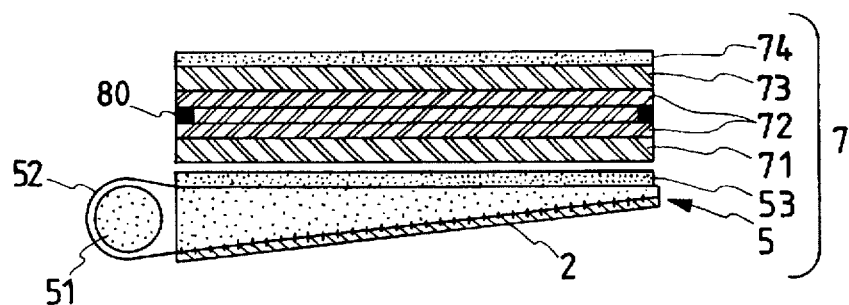
FIG. 13 is a sectional side view of one embodiment of a liquid crystal display.
Figure 14:
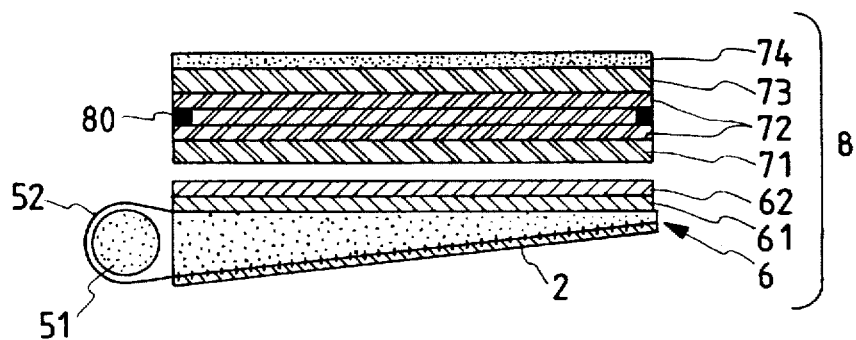
FIG. 14 is a sectional side view of another embodiment of the liquid crystal display example.

FIG. 13 shows a liquid crystal display 7 using the surface light source device 5 according to the invention as a back light system. FIG. 14 shows a liquid crystal display 8 using the polarized light source device 6 according to the invention as a back light system. In the drawings, numeral 71 is a lower polarizing plate, numeral 72 is liquid crystal cells, numeral 73 is an upper polarizing plate, and numeral 74 is a diffusion plate. The lower polarizing plate 71 and the diffusion plate 74 are disposed as required. In FIGS. 13 and 14, a reference numeral 80 designates a liquid crystal layer.

Generally, the liquid crystal display is formed by properly assembling liquid crystal cells functioning as liquid crystal shutters, a drive for driving the liquid crystal cells, a polarizing plate, a back light, and other components such as a phase difference plate for compensation as required. In the invention, it is not limited except that the light guide plate according to the invention or the surface light source device or polarized light source device using the light guide plate is used, and can be formed as former. Particularly, direct-view-type liquid crystal displays can be formed preferably.

Therefore, the liquid crystal cells used with the liquid crystal display are not limited and appropriate ones can be used. The polarized light source device is useful for a liquid crystal display for allowing polarized light to be incident on liquid crystal cells to produce display; for example, it can be used preferably for liquid crystal cells using twisted nematic or super twisted nematic liquid crystal, but can also be used for liquid crystal cells using untwisted liquid crystal, guest host mode liquid crystal comprising a dichromatic dye dispersed in liquid crystal, or ferroelectric liquid crystal. The liquid crystal drive system is not limited either.

Preferably the polarizing plate, particularly the polarizing plate on the back light side uses a component high in the polarization degree, such as an iodine or dye absorption type linear light polarizer from the view of producing good contrast display by incidence of highly linearly polarized light. To form a liquid crystal display, proper optical elements such as a diffusion plate, an anti-glare layer, a reflection prevention film, a protection film, and a protection plate disposed on the polarizing plate on the visual recognition side, and a phase difference plate for compensation disposed between the liquid crystal cells and the polarizing plate can be placed appropriately.

The phase difference plate for compensation is intended for compensating wavelength dependency of double refraction for improving the viewability, etc. In the invention, it is placed between the polarizing plate on the visual recognition side and/or the back light side and the liquid crystal cells as required. An appropriate phase difference plate for compensation can be used in response to the wavelength zone, etc., and may be formed as a layer or a laminate of two or more layers.

A light guide plate for allowing light to go out from the outgoing radiation plane in a perpendicular direction or in a close direction is used preferably with liquid crystal displays. If the outgoing light shifts from the perpendicular direction, the outgoing radiation direction can be corrected via a prism sheet, etc. In this case, an element changing the polarized light state as less as possible is preferably used.

In the invention, the optical elements and parts for forming the light guide plate, surface light source device, polarized light source device, or liquid crystal display described above may be integrally laminated as a whole or partially or may be placed in a state in which they can be easily separated. Various diffusion plates, etc., can be placed on the top of the surface light source device; a diffusion plate, etc., that can maintain a polarized light characteristic can be placed on the top of the polarized light source device.

REFERENCE EXAMPLE 1

A film of a side-chain type cholesteric liquid crystal polymer with glass transition temperature 57° C. having an acrylic backbone chain was formed on a polyimide rubbing treatment face of a glass plate by a spin coat method, then was heated at 130° C. for 30 seconds, then furthermore heated at 110° C. for 2 minutes and rapidly cooled, providing a polarized light separation plate showing a selective reflection state like a mirror. This polarized light separation plate showed a good selective reflective property in the wavelength range of 420 to 505 nm and selectively reflected 90% or more of light in this region in a positive reflection direction.

REFERENCE EXAMPLE 2

A film of a side-chain type cholesteric liquid crystal polymer with glass transition temperature 64° C. having an acrylic backbone chain was formed on a polyimide rubbing treatment face of a glass plate by a spin coat method, then was heated at 150° C. for 30 seconds, then furthermore heated at 130° C. for 2 minutes and rapidly cooled, providing a polarized light separation plate showing a selective reflection state like a mirror. This polarized light separation plate showed a good selective reflective property in the wavelength range of 500 to 590 nm and selectively reflected 90% or more of light in this region in a positive reflection direction.

REFERENCE EXAMPLE 3

A film of a side-chain type cholesteric liquid crystal polymer with glass transition temperature 75° C. having an acrylic backbone chain was formed on a polyimide rubbing treatment face of a glass plate by a spin coat method, then was heated at 170° C. for 30 seconds, then furthermore heated at 145° C. for 2 minutes and rapidly cooled, providing a polarized light separation plate showing a selective reflection state like a mirror. This polarized light separation plate showed a good selective reflective property in the wavelength range of 595 to 705 nm and selectively reflected 90% or more of light in this region in a positive reflection direction.

REFERENCE EXAMPLE 4

The polarized light separation plates provided in Reference Examples 1 to 3 were laminated to provide a lamination type polarized light separation plate. This polarized light separation plate showed a good selective reflective property in the wavelength range of 420 to 705 nm and selectively reflected 90% or more of light in this region in a positive reflection direction.

REFERENCE EXAMPLE 5

Polarized light separation plates were provided in the same manner as Reference Examples 1 to 3 except that a triacetylcellulose film rather than the glass plate was used as a substrate, and they were used to provide a lamination type polarized light separation plate in the same manner as Reference Example 4. In this case, the selective reflective characteristic of the polarized light separation plate was the same as that in the reference examples.

Embodiment 1

Transparent epoxy resin was poured into a metal mold subjected to release treatment and was heated at 100° C. for 2 hours, then furthermore heated at 150° C. for 3 hours and hardened, then gradually cooled, providing a light guide plate. This light guide plate is 195 mm wide and 150 mm deep and has an incidence plane 5 mm thick, its opposed end 1 mm thick, a flat outgoing radiation plane, and a bottom having recesses (FIG. 6(a)) parallel with the incidence plane at 225 µm pitches on effective width 185 mm on the full face of a bend face (FIG. 3) projecting to the lower side close to a flat surface from the incidence plate to its opposed end. Each of the recesses has the projection widths on the outgoing radiation plane, 25 µm on a short-side face and 200 µm on a long-side face (projection area ratio: short-side face/long-side face=1/8), 20 µm high, and the angle with the outgoing radiation plane, 40.2 degrees (θ2) on the short-side face and −4.2 degrees (θ1) on the long-side face, as listed in Table 1.

The recesses were measured with surface form measurement apparatus. With an assumed bottom side on the transverse section of the recess as the reference side, the projection widths of the short-side and long-side faces on the outgoing radiation plane were determined based on the lengths of left and right sides divided by the normal to the reference side from a vertex (intersection of the short-side and long-side faces), and the height was determined by the normal length between the vertex and the reference side. Inversion of the signs (+ and−) of the angles with the outgoing radiation plane on the short-side and long-side faces means that the measurement direction is inverted with the outgoing radiation plane as reference and that the short-side face measurement direction was positive.

EXAMPLE 2

A silver thin film was vacuum-evaporated thickly on the bottom of the light guide plate as in Embodiment 1, providing a light guide plate formed with a reflection layer.

Embodiment 3

Metal molds of different shapes were used to provide a light guide plate as in Embodiment 1 and a reflection layer made of a silver-evaporated thin film was formed on the bottom as in Embodiment 2. This light guide plate is 195 mm wide and 150 mm deep and has an incidence plane 5 mm thick, its opposed end 1 mm thick, a flat outgoing radiation plane, and a bottom having recesses (FIG. 6(a)) parallel with the incidence plane on effective width 185 mm on the full face of a bend face (FIG. 4) projecting to the lower side with a curvature increasing gradually from the incidence plate to its opposed end and becoming the thickest at a position of 55 mm from the incidence plane. As the recesses are distant from the incidence plane, inclination of short-side faces increases and that of long-side faces decreases and their projection area ratio lessens gradually, as listed in Table 1.

Embodiment 4

Metal molds of different shapes were used to provide a light guide plate as in Embodiment 1 and a reflection layer made of a silver evaporated thin film was formed on the bottom as in Embodiment 2. This light guide plate is 195 mm wide and 150 mm deep and has an incidence plane 5 mm thick, its opposed end 1 mm thick, a flat outgoing radiation plane, and a bottom having recesses (FIG. 6(a)) parallel with the incidence plane on effective width 185 mm on the full face of a bend face (FIG. 3) projecting to the lower side close to a flat surface from the incidence plate to its opposed end and becoming the thickest at a position of 25 mm from the incidence plane. As the recesses are distant from the incidence plane, inclination of short-side faces increases and that of long-side faces decreases and their projection area ratio lessens gradually, as listed in Table 1.

Embodiment 5

The recesses on the bottom of the light guide plate provided according to Embodiment 1 were ground and removed to form a wedge. A separately formed bottom sheet having recesses on one side was bonded with an adhesive with refractive index almost matched, and a reflection layer made of a silver-evaporated thin film was formed on the recess bottoms according to Embodiment 2 , providing a light guide plate. This light guide plate is 150 mm wide and 150 mm deep and has an incidence plane 5 mm thick, its opposed end 1 mm thick, and an outgoing radiation plane and a bottom having recesses (Table 1 ) on effective width 130 mm almost as in Embodiment 1.

To provide the bottom sheet, one part of polymerization initiator by weight and 50 parts of methylene chloride by weight were added to 100 parts of urethane acrylate resin by weight, defoaming was executed, and drying was applied, then they were poured into a predetermined mold and with a polyester film cover, irradiated with ultraviolet rays and polymerized.

Embodiment 6

A light guide plate (Table 1 ) was provided in the same manner as Embodiment 5 except that no reflection layer was added to the bottom.

Embodiment 7

A light guide plate (Table 2) was provided in the same manner as Embodiment 4 except that no reflection layer was added to the bottom.

Embodiment 8

Metal molds of different shapes were used to provide a light guide plate as in Embodiment 1. This light guide plate is 195 mm wide and 150 mm deep and has an incidence plane and its opposed end both 5 mm thick (forming a uniformly thick substance), a flat outgoing radiation plane, and a bottom substantially uniformly having recesses parallel with the incidence plane on effective width 185 mm on the full face. Each of the recesses comprises a short-side face and a long-side face as listed in Table 2.

Comparison 1

A polymethyl methacrylate plate having a triangular prism of vertical angle 90 degrees and slope angle 45 degrees in a width direction on one side and a wedge-like polymethyl methacrylate plate are bonded with an adhesive with refractive index almost matched, providing a light guide plate. This light guide plate is 200 mm wide and 150 mm deep and has an incidence plane 5 mm thick, its opposed end 1 mm thick, a flat outgoing radiation plane, and a bottom having prism structure of a characteristic listed in Table 2 at 200 mm pitches.

Comparison 2

A silver thin film was vacuum-evaporated thickly on the bottom of the light guide plate as in Comparison 1, providing a light guide plate formed with a reflection layer (Table 2).

Comparison 3

Metal molds of different shapes were used to provide a light guide plate as in Embodiment 1 and a reflection layer made of a silver-evaporated thin film was formed on the bottom as in Embodiment 2. This light guide plate is 195 mm wide and 150 mm deep and has an incidence plane 5 mm thick, its opposed end 1 mm thick, a flat outgoing radiation plane, and a bottom having recesses of a characteristic listed in Table 2 parallel with the incidence plane on effective width 185 mm on the full face of a bend face (FIG. 3) projecting to the lower side close to a flat surface from the incidence plate to its opposed end.

Comparison 4

Fifty parts of methyl methacrylate by weight, five parts of triethylene glycol dimethacrylate by weight, 25 parts of titanium oxide powder having an average particle diameter of 15 μm by weight, one part of benzoyl peroxide by weight, one part of perroil TCP by weight, and 100 parts of methylene chloride by weight were mixed and dry nitrogen was blown, then the mixture was defoamed. The resultant material was applied to one side of a polymethyl methacrylate plate 80 mm wide, 140 mm deep, and 5 mm thick. After methylene chloride volatilized, with the surface covered with a separator, the plate was heated at 50° C. for two hours, then furthermore heated at 70° C. for two hours and the separator was stripped off. Then, the plate was heated at 80° C. for two hours, providing a light guide plate having a diffusion reflection layer showing a complete concealment property (Table 2).

Comparison 5

A light guide plate (Table 2) was provided in the same manner as Comparison 3 except that no reflection layer was formed on the bottom.

Comparison 6

One side of a polymethyl methacrylate plate 80 mm wide, 140 mm deep, and 5 mm thick was put into a uniform coarse surface with sand paper No.400 to form a bottom like ground glass, providing a light guide plate (Table 2).

Embodiment 9

A cold cathode tube 3 mm in diameter was placed on the incidence plane of the light guide plate provided in Embodiment 1 and was surrounded by a light source holder made of a silver-evaporated polyester film and a reflection sheet made of a silver-evaporated polyester film was placed on the bottom of the light guide plate, providing a surface light source device of side light type.

Embodiment 10

A cold cathode tube 3 mm in diameter was placed on the incidence plane of the light guide plate provided in Embodiment 2 and was surrounded by a light source holder made of a silver-evaporated polyester film, providing a surface light source device of side light type.

Embodiment 11

A surface light source device was provided in the same manner as Embodiment 10 except that the light guide plate provided in Embodiment 3 was used.

Embodiment 12

A surface light source device was provided in the same manner as Embodiment 10 except that the light guide plate provided in Embodiment 4 was used.

Embodiment 13

A surface light source device was provided in the same manner as Embodiment 10 except that the light guide plate provided in Embodiment 5 was used.

Embodiment 14

A surface light source device was provided in the same manner as Embodiment 9 except that the light guide plate provided in Embodiment 6 was used.

Embodiment 15

A surface light source device was provided in the same manner as Embodiment 9 except that the light guide plate provided in Embodiment 7 was used.

Embodiment 16

A surface light source device was provided in the same manner as Embodiment 9 except that the light guide plate provided in Embodiment 8 was used.

Comparison 7

A surface light source device was provided in the same manner as Embodiment 9 except that the light guide plate provided in Comparison 1 was used.

Comparison 8

A surface light source device was provided in the same manner as Embodiment 10 except that the light guide plate provided in Comparison 2 was used.

Comparison 9

A surface light source device was provided in the same manner as Embodiment 10 except that the light guide plate provided in Comparison 3 was used.

Comparison 10

A surface light source device was provided in the same manner as Embodiment 10 except that the light guide plate provided in Comparison 4 was used.

Comparison 11

A surface light source device was provided in the same manner as Comparison 10 except that a prism sheet was placed on the outgoing radiation plane of the light guide plate.

Comparison 12

A surface light source device was provided in the same manner as Embodiment 9 except that the light guide plate provided in Comparison 5 was used.

Comparison 13

A surface light source device was provided in the same manner as Embodiment 10 except that the light guide plate provided in Comparison 6 was used.

Comparison 14

A surface light source device was provided in the same manner as Comparison 13 except that a prism sheet was placed on the outgoing radiation plane of the light guide plate.

Evaluation Test 1

The light sources of the surface light source devices provided in Embodiments 9 to 13 and Comparisons 7 to 11 were turned on. In a darkroom, a color difference meter (manufactured by Minoruta, CS-100) was used to examine the surface luminance intensity in a perpendicular direction and in 30-degree tilt directions on the light source side (minus direction) and its opposite side (plus direction) on the outgoing radiation plane at positions spaced 30 mm apart starting at a position 10 mm distant from the incidence plane along the center in the width direction of each light guide plate.

Tables 3 to 5 list the test results.

It is seen from Tables 3 to 5 that the surface light source devices of Embodiments are excellent in the surface luminance intensity in the perpendicular direction and uniformity of the light emission as compared with those of Comparisons. It is observed that the surface light source devices of Comparisons emit light strongly in directions largely tilting from the perpendicular direction and also emit light strongly in tilt directions of 30 degrees or more; it is seen that the surface light source devices of Embodiments are excellent in perpendicular directivity.

Further, light leaking out from the end face opposed to the incidence plane is 230 cd/m² in Embodiment 3 (1 mm thick), but is 940 cd/m² in Comparison 4 (5 mm thick), indicating that light about 20 times that in Embodiment 3 is not allowed to go out from the outgoing radiation plane and is lost as light leaking out from the end face when the thickness difference is considered. In this case, a diffusion sheet was placed on the end face opposed to the incidence plane for measurement to compound light passing through the light guide plate directly from the light source and any other lost light.

Evaluation Test 2

A polarizing plate (manufactured by Nitto Denko, G1220DUN) was placed on each of the surface light source devices provided in Embodiments 9, 10, and 14 to 16 and Comparisons 7 and 10 to 14 and the light sources were turned on. Examined in a darkroom were the angle of the maximum luminance intensity direction and the surface luminance intensity on the outgoing radiation plane at positions 30 mm, 70 mm, and 110 mm distant from the incidence plane along the center in the width direction of each light guide plate. The half value width of the outgoing luminous flux amount in the perpendicular direction (direction in which light condensing property is the highest) on the outgoing radiation plane at the position 70 mm distant from the incidence plane was also examined.

Tables 6 and 7 list the test results.

It is seen from Tables 6 and 7 that the surface light source devices of Embodiments are excellent in the surface intensity in the maximum outgoing radiation direction and uniformity of the light emission as compared with those of Comparisons. It is also seen that the surface light source device of Comparison 10 has the large half value width of outgoing light and is poor in directivity of light, but the surface light source devices of Embodiments have small half value widths, condense outgoing light in a narrow range, and are excellent in directivity.

Evaluation Test 3

For each of the surface light source devices formed with a polarizing plate provided in Embodiments 9 and 14 to 16 and Comparisons 7 and 10 to 14, a goniophotometer (manufactured by Murakami Shikisaisha, GP-200) was used to measure the angle (outgoing radiation angle) of the maximum luminance intensity direction of again outgoing light and the again outgoing light amount in the solid angle 15-degree or 1-degree range with the outgoing radiation angle direction as the center on the outgoing radiation plane when light was allowed to be incident from the angle showing the maximum intensity direction (incident angle) in Evaluation test 2 based on the position 70 mm distant from the incidence plane, and the ratio of the again outgoing light amount to the incident light amount was examined.

Table 8 lists the test results.

It is seen from Table 8 that in Embodiments, reincident light through the polarized light separation means based on the maximum luminance intensity direction again goes out with a shift within 20 degrees relative to initial outgoing light and that the again outgoing light condenses in the maximum luminance intensity direction and has high directivity. On the other hand, it is seen from the table that in Comparisons, the shift exceeds 20 degrees or again outgoing light is less and is also poor in directivity.

Embodiment 17

The polarized light separation plate provided in Reference Example 4 was placed on the outgoing radiation plane of the light guide plate in the surface light source device provided in Embodiment 9, providing a polarized light source device.

Embodiment 18

A polarized light source device was provided in the same manner as Embodiment 17 except that the surface light source device provided in Embodiment 10 was used.

Embodiment 19

A polarized light source device was provided in the same manner as Embodiment 17 except that the surface light source device provided in Embodiment 11 was used.

Embodiment 20

A polarized light source device was provided in the same manner as Embodiment 17 except that the surface light source device provided in Embodiment 12 was used.

Embodiment 21

A polarized light source device was provided in the same manner as Embodiment 17 except that the surface light source device provided in Embodiment 13 was used.

Comparison 15

A polarized light source device was provided in the same manner as Embodiment 17 except that the surface light source device provided in Comparison 7 was used.

Comparison 16

A polarized light source device was provided in the same manner as Embodiment 17 except that the surface light source device provided in Comparison 8 was used.

Comparison 17

A polarized light source device was provided in the same manner as Embodiment 17 except that the surface light source device provided in Comparison 9 was used.

Comparison 18

A polarized light source device was provided in the same manner as Embodiment 17 except that the surface light source device provided in Comparison 10 was used.

Comparison 19

A polarized light source device was provided in the same manner as Embodiment 17 except that the surface light source device provided in Comparison 11 was used.
Evaluation Test 4

The surface luminance intensity was examined for the polarized light source devices provided in Embodiments 17 to 21 and Comparisons 15 to 19 in the same manner as Evaluation Test 1 for the surface light source devices.

Tables 9 to 11 list the test results.

It is seen from Tables 9 to 11 that the polarized light source devices of Embodiments are remarkably excellent in the surface luminance intensity as compared with those of Comparisons. It is also seen from the tables that in comparison with polarized light source devices formed with no polarized light separation plate, the surface luminance intensity remarkably deteriorates to about a half in Comparisons, but less deteriorates in Embodiments.

This characteristic indicates that in Embodiments, reincident light through the polarized light separation plate is converted into polarized light through the light guide plate and then is allowed to again go out efficiently as predetermined circularly polarized light with good perpendicularity and that the effect is small in Comparisons. Particularly, the light guide plate in Comparison 3 resembles that in Embodiments and shows the luminance intensity relatively close to that in Embodiments at the surface light source device level, but very little increases in the luminance intensity at the polarized light source device level; as compared with Embodiments, a large luminance intensity difference occurs and the effect difference between Embodiments and Comparisons is large.

Embodiment 22

The polarized light separation plate provided in Reference Example 5, a phase difference plate with a phase difference of 135 nm, a polarizing plate (G1220DUN) were placed in order on the outgoing radiation plane of the light guide plate in the surface light source device provided in Embodiment 9, providing a polarized light source device. The polarizing plate was adjusted in rotation so as to show the maximum intensity.

Embodiment 23

A polarized light source device was provided in the same manner as Embodiment 22 except that the surface light source device provided in Embodiment 10 was used.

Embodiment 24

A polarized light source device was provided in the same manner as Embodiment 22 except that the surface light source device provided in Embodiment 14 was used.

Embodiment 25

A polarized light source device was provided in the same manner as Embodiment 22 except that the surface light source device provided in Embodiment 15 was used.

Embodiment 26

A polarized light source device was provided in the same manner as Embodiment 22 except that the surface light source device provided in Embodiment 16 was used.

Comparison 20

A polarized light source device was provided in the same manner as Embodiment 22 except that the surface light source device provided in Comparison 7 was used.

Comparison 21

A polarized light source device was provided in the same manner as Embodiment 22 except that the surface light source device provided in Comparison 10 was used.

Comparison 22

A polarized light source device was provided in the same manner as Embodiment 22 except that the surface light source device provided in Comparison 11 was used.

Comparison 23

A polarized light source device was provided in the same manner as Embodiment 22 except that the surface light source device provided in Comparison 12 was used.

Comparison 24

A polarized light source device was provided in the same manner as Embodiment 22 except that the surface light source device provided in Comparison 13 was used.

Comparison 25

A polarized light source device was provided in the same manner as Embodiment 22 except that the surface light source device provided in Comparison 14 was used.
Evaluation Test 5

The angle of the maximum luminance intensity direction and the surface intensity on the outgoing radiation plane at each position were examined for the polarized light source devices provided in Embodiments 22 to 26 and Comparisons 20–25 in the same manner as Evaluation Test 2 for the surface light source devices. Also, the outgoing light amount ratio between Embodiments 22–26 and Comparisons 20 to 25 and Embodiments 9, 10, and 14 to 16 and Comparisons 7 and 10 to 14 was examined.

Tables 12 and 13 list the test results.

It is seen from Tables 12 and 13 that the polarized light source devices of Embodiments are remarkably excellent in the surface intensity as compared with those of Comparisons as with the surface light source devices. It is also seen from the tables that in comparison with polarized light source devices formed with no polarized light separation plate, the light amounts largely increase in Embodiments, but the light amount ratio is close to 1 in all Comparisons except 21 and the light amount increase effect of the polarized light separation plate is little produced.

Particularly, in control example 20, as the polarized light separation plate is placed, the light amount lowers partially. In Comparison 23, when the short-side face shape is close to that in Embodiments and no polarized light separation plate is placed, a comparatively good outgoing radiation characteristic is shown, but no improvement effect is produced by placement of the polarized light separation plate and a large light amount difference from Embodiments occurs. Further, Comparison 21 is good in the light amount ratio, but poor in the light amount itself. Comparison 22 is also poor in the improvement effect, wherein the light amount is decreased, the luminance intensity is enhanced by the polarized light separation plate, and a prism sheet is added; it is poor in practical use as an illumination system. On the other hand, Comparison 24 is large in inclination of the maximum intensity direction and also large in dispersion and poor in directivity.

The characteristics indicate that reincident light through the polarized light separation plate is allowed to again go out in good directional conformity with initial outgoing light in Embodiments and that the effect is small in Comparisons. Therefore, in the polarized light source device with the polarized light separation plate, the half value width of outgoing light of the light guide plate, the shift amount between again outgoing light of reincident light through the polarized light separation plate and initial outgoing light, the outgoing light amount, and the like greatly affect performance as an illumination system; an excellent illumination system is provided according to the invention.

Embodiment 27

Super twisted nematic liquid crystal cells were placed on the outgoing radiation plane of the light guide plate in the surface light source device provided in Embodiment 9, providing a liquid crystal display. The liquid crystal cell is formed on each side with a position difference plate and is adjusted to normally white monochrome mode.

Embodiment 28

A liquid crystal display was provided in the same manner as Embodiment 27 except that the surface light source device provided in Embodiment 10 was used.

Embodiment 29

A liquid crystal display was provided in the same manner as Embodiment 27 except that the surface light source device provided in Embodiment 11 was used.

Embodiment 30

A liquid crystal display was provided in the same manner as Embodiment 27 except that the surface light source device provided in Embodiment 12 was used.

Embodiment 31

A liquid crystal display was provided in the same manner as Embodiment 27 except that the surface light source device provided in Embodiment 13 was used.

Comparison 26

A liquid crystal display was provided in the same manner as Embodiment 27 except that the surface light source device provided in Comparison 7 was used.

Comparison 27

A liquid crystal display was provided in the same manner as Embodiment 27 except that the surface light source device provided in Comparison 8 was used.

Comparison 28

A liquid crystal display was provided in the same manner as Embodiment 27 except that the surface light source device provided in Comparison 9 was used.

Comparison 29

A liquid crystal display was provided in the same manner as Embodiment 27 except that the surface light source device provided in Comparison 10 was used.

Comparison 30

A liquid crystal display was provided in the same manner as Embodiment 27 except that the surface light source device provided in Comparison 11 was used.

Evaluation Test 6

For the liquid crystal displays provided in Embodiments 27–31 and Comparisons 26 to 30, the surface luminance intensity in nonselection state was examined in the same manner as Evaluation Test 1 for the surface light source devices. The measurement positions were positions 30 mm, 70 mm, and 110 mm apart from the incidence plane of the light guide plate.

It is seen from Tables 14 to 16 that the liquid crystal displays of Embodiments are excellent in the surface intensity as compared with those of Comparisons.

Embodiment 32

A phase difference plate made of polycarbonate with a phase difference of 130 nm and a polarizing plate (manufactured by Nitto Denko, G1229DU) with a polarization axis made to cross 45 degrees an optical axis of the phase difference plate were placed in order on the top face of the polarized light separation plate in the polarized light source device provided in Embodiment 17, and super twisted nematic liquid crystal cells were placed thereon, providing a liquid crystal display adjusted to normally white monochrome mode. When the polarizing plate was placed, it was rotated. Whenever it was rotated 90 degrees, the outgoing radiation strength changed and outgoing light through the phase difference plate was polarized.

Embodiment 33

A liquid crystal display was provided in the same manner as Embodiment 32 except that the polarized light source device provided in Embodiment 18 was used.

Embodiment 34

A liquid crystal display was provided in the same manner as Embodiment 32 except that the polarized light source device provided in Embodiment 19 was used

Embodiment 35

A liquid crystal display was provided in the same manner as Embodiment 32 except that the polarized light source device provided in Embodiment 20 was used.

Embodiment 36

A liquid crystal display was provided in the same manner as Embodiment 32 except that the polarized light source device provided in Embodiment 21 was used.

Comparison 31

A liquid crystal display was provided in the same manner as Embodiment 32 except that the polarized light source device provided in Comparison 15 was used.

Comparison 32

A liquid crystal display was provided in the same manner as Embodiment 32 except that the polarized light source device provided in Comparison 16 was used.

Comparison 33

A liquid crystal display was provided in the same manner as Embodiment 32 except that the polarized light source device provided in Comparison 17 was used.

Comparison 34

A liquid crystal display was provided in the same manner as Embodiment 32 except that the polarized light source device provided in Comparison 18 was used.

Comparison 35

A liquid crystal display was provided in the same manner as Embodiment 32 except that the polarized light source device provided in Comparison 19 was used.

Evaluation Test 7

For the liquid crystal displays provided in Embodiments 32 to 36 and Comparisons 31 to 35, the surface luminance intensity in nonselection state was examined in the same manner as Evaluation Test 6 for the liquid crystal displays.

Tables 17 to 19 list the test results.

It is seen from Tables 17 to 19 that the liquid crystal displays of Embodiments are excellent in the surface luminance intensity as compared with those of Comparisons. It is also seen from the tables that the intensity is enhanced as compared with that provided by the liquid crystal displays using the surface light source device and can be enhanced by polarizing light through the polarized light separation plate.

The total results indicate that a surface light source device can be provided which efficiently diverts incident light of horizontal type to outgoing light of perpendicular type by the light guide plate according to the invention and generates light excellent in perpendicularity and parallel light property with good light use efficiency and that a liquid crystal display can be formed which polarizes the light from the surface light source device through polarized light separation means and produces bright and easy-to-view display of a high quality.

Embodiment 37

Super twisted nematic liquid crystal cells were placed on the polarized light source device provided in Embodiment 22, and a phase difference plate was placed thereon, providing a liquid crystal display adjusted to normally white monochrome mode.

Embodiment 38

A liquid crystal display was provided in the same manner as Embodiment 37 except that the polarized light source device provided in Embodiment 23 was used.

Embodiment 39

A liquid crystal display was provided in the same manner as Embodiment 37 except that the polarized light source device provided in Embodiment 24 was used.

Embodiment 40

A liquid crystal display was provided in the same manner as Embodiment 37 except that the polarized light source device provided in Embodiment 25 was used.

Embodiment 41

A liquid crystal display was provided in the same manner as Embodiment 37 except that the polarized light source device provided in Embodiment 26 was used.

Comparison 36

A liquid crystal display was provided in the same manner as Embodiment 37 except that the polarized light source device provided in Comparison 20 was used.

Comparison 37

A liquid crystal display was provided in the same manner as Embodiment 37 except that the polarized light source device provided in Comparison 21 was used.

Comparison 38

A liquid crystal display was provided in the same manner as Embodiment 37 except that the polarized light source device provided in Comparison 22 was used.

Comparison 39

A liquid crystal display was provided in the same manner as Embodiment 37 except that the polarized light source device provided in Comparison 23 was used.

Comparison 40

A liquid crystal display was provided in the same manner as Embodiment 37 except that the polarized light source device provided in Comparison 24 was used.

Comparison 41

A liquid crystal display was provided in the same manner as Embodiment 37 except that the polarized light source device provided in Comparison 25 was used.

Evaluation Test 8

For the liquid crystal displays provided in Embodiments 37 to 41 and Comparisons 36 to 41, the angle of the maximum luminance intensity direction and the surface luminance intensity in nonselection state were examined in the same manner as Evaluation Test 2.

Tables 20 and 21 list the test results.

It is seen from Tables 20 and 21 that the liquid crystal displays of Embodiments are excellent in the surface luminance intensity as compared with those of Comparisons. When a reflection plate comprising an evaporated reflection layer made of an aluminum thin film on a matted polyester film and has a half value width within 10 degrees when parallel light is incident is used in place of the mirror reflection plate as the reflection plate, a similar tendency as described above is also indicated and surface light source devices showing a bright outgoing radiation characteristic are provided in Embodiments; when the polarized light separation means is placed, the outgoing light amount also increases about 1.4 times. However, surface light source devices showing a bright outgoing radiation characteristic are not provided in Comparisons; when the polarized light separation means is placed, the outgoing light amount increases about 1.2 times or less.

Further, when a white diffusion reflection plate made of porous polyester is used as the reflection plate, a similar tendency as described above is also indicated and surface light source devices showing a bright outgoing radiation characteristic are provided in Embodiments; when the polarized light separation means is placed, the outgoing light amount also increases about 1.4 times. However, surface light source devices showing a bright outgoing radiation characteristic are not provided in Comparisons; when the polarized light separation means is placed, the outgoing light amount increases about 1.2 to 1.25 times.

According to the invention, light guide plates and surface light source devices showing a bright outgoing radiation characteristic can be provided, polarized light source devices excellent in light use efficiency can be provided using the polarized light separation means, and bright liquid crystal displays excellent in display quality can be provided.

TABLE 1

| | Distance from incidence plane (mm) | Recess structure (μm) Short-side face | Recess structure (μm) Long-side face | Recess structure (μm) Height | Slope angle (degrees) Short-side face | Slope angle (degrees) Long-side face | Projection area ratio Short/long-side face |
|---|---|---|---|---|---|---|---|
| Embodiment 1 | Full face | 25 | 200 | 20 | 40.2 | −4.2 | 1/8 |
| Embodiment 2 | Full face | 25 | 200 | 20 | 38.7 | −5.7 | 1/8 |
| Embodiment 3 | 30 | 25 | 205 | 19 | 36 | −6.3 | 1/8 |
| | 70 | 25 | 193 | 20 | 43.5 | −1.5 | 1/8 |
| | 110 | 25 | 181 | 20 | 43.5 | −1.5 | 1/7 |
| Embodiment 4 | 30 | 12.5 | 188 | 9 | 36 | −2.4 | 1/21 |
| | 70 | 13.5 | 187 | 12 | 41.5 | −2.2 | 1/16 |
| | 110 | 15.5 | 184 | 14.5 | 43 | −1.8 | 1/13 |
| Embodiment 5 | Full face | 25 | 200 | 19 | 38.7 | −3.9 | 1/8 |
| Embodiment 6 | Full face | 25 | 200 | 19 | 38.7 | −3.9 | 1/8 |

TABLE 2

| | Distance from incidence plane (mm) | Recess structure (μm) Short-side face | Recess structure (μm) Long-side face | Recess structure (μm) Height | Slope angle (degrees) Short-side face | Slope angle (degrees) Long-side face | Projection area ratio Short/long-side face |
|---|---|---|---|---|---|---|---|
| Embodiment 7 | 30 | 25 | 205 | 19 | 36 | −6.3 | 1/8 |
| | 70 | 25 | 193 | 20 | 39.5 | −5.9 | 1/8 |
| | 110 | 25 | 181 | 20 | 43.5 | −1.5 | 1/7 |
| Embodiment 8 | Full face | 25 | 200 | 20 | 40.2 | −4.2 | 1/8 |
| Comparison 1 | Full face | 99 | 101 | 94 | 45.0 | −41.4 | 1/1 |
| Comparison 2 | Full face | 99 | 100 | 93 | 44.7 | −41.7 | 1/1 |
| Comparison 3 | Full face | 60 | 120 | 48 | 40.2 | −21.8 | 1/2 |
| Comparison 4 | — | — | — | — | — | — | — |
| Comparison 5 | Full face | 60 | 120 | 48 | 40.2 | −21.8 | 1/2 |
| Comparison 6 | — | — | — | — | — | — | — |

TABLE 3

| | Tilt Direction (degree) | Measurement positions (mm) and surface luminance intensity at the positions (cd/m²) 10 | 40 | 70 | 100 | 130 |
|---|---|---|---|---|---|---|
| Embodiment 9 | −30 | 262 | 157 | 91 | 66 | 38 |
| | Perpendicular | 1050 | 1060 | 815 | 550 | 312 |
| | 30 | 1150 | 890 | 322 | 105 | 56 |
| Embodiment 10 | −30 | 407 | 274 | 156 | 85 | 56 |
| | Perpendicular | 1110 | 1020 | 721 | 444 | 282 |
| | 30 | 1130 | 870 | 342 | 91 | 71 |
| Embodiment 11 | −30 | 184 | 94 | 51 | 37 | 25 |
| | Perpendicular | 1370 | 1140 | 861 | 672 | 458 |
| | 30 | 734 | 458 | 241 | 101 | 77 |

TABLE 4

| | Tilt Direction (degree) | Measurement positions (mm) and surface luminance intensity at the positions (cd/m²) 10 | 40 | 70 | 100 | 130 |
|---|---|---|---|---|---|---|
| Embodiment 12 | −30 | 211 | 78 | 36 | 19 | 14 |
| | Perpendicular | 1340 | 1170 | 1010 | 884 | 676 |
| | 30 | 683 | 246 | 171 | 48 | 26 |
| Embodiment 13 | −30 | 451 | 301 | 135 | 72 | 52 |
| | Perpendicular | 1120 | 981 | 692 | 482 | 262 |
| | 30 | 1020 | 698 | 311 | 104 | 84 |
| Comparison 7 | −30 | 482 | 111 | 31 | 11 | 7 |
| | Perpendicular | 1080 | 243 | 68 | 39 | 19 |
| | 30 | 215 | 93 | 27 | 9 | 8 |
| Comparison 8 | −30 | 591 | 162 | 32 | 11 | 4 |
| | Perpendicular | 997 | 255 | 71 | 38 | 16 |
| | 30 | 254 | 74 | 29 | 9 | 6 |

TABLE 5

| | Tilt Direction (degree) | Measurement positions (mm) and surface luminance intensity at the positions (cd/m²) 10 | 40 | 70 | 100 | 130 |
|---|---|---|---|---|---|---|
| Comparison 9 | −30 | 411 | 256 | 131 | 81 | 49 |
| | Perpendicular | 1170 | 1080 | 788 | 346 | 121 |
| | 30 | 1180 | 841 | 369 | 104 | 69 |
| Comparison 10 | −30 | 26 | 21 | 18 | 15 | 9 |
| | Perpendicular | 148 | 68 | 43 | 36 | 26 |
| | 30 | 265 | 201 | 117 | 78 | 54 |
| Comparison 11 | −30 | 411 | 209 | 155 | 108 | 54 |
| | Perpendicular | 821 | 485 | 264 | 181 | 125 |
| | 30 | 503 | 300 | 167 | 122 | 86 |

TABLE 6

| | Maximum luminance intensity direction angle (degree) and surface luminance intensity (cd/m²) Measurement positions (mm) | | | | | | Half value width (degree) |
|---|---|---|---|---|---|---|---|
| | 30 | | 70 | | 110 | | |
| | Angle | Intensity | Angle | Intensity | Angle | Intensity | |
| Embodiment 9 | 5 | 906 | 8 | 412 | 12 | 221 | 43 |
| Embodiment 10 | 13 | 689 | 12 | 397 | 10 | 227 | 42 |
| Embodiment 14 | 7 | 792 | 8 | 388 | 15 | 243 | 41 |
| Embodiment 15 | 11 | 728 | 9 | 577 | 7 | 459 | 39 |
| Embodiment 16 | 13 | 665 | 12 | 332 | 10 | 201 | 45 |
| Comparison 7 | 10 | 411 | 7 | 54 | 6 | 4 | 44 |
| Comparison 10 | 0 | 157 | 4 | 97 | 2 | 62 | 105 |
| Comparison 11 | −1 | 265 | 3 | 154 | 2 | 91 | 48 |
| Comparison 12 | 5 | 924 | 9 | 236 | 7 | 142 | 45 |

TABLE 7

| | Maximum luminance intensity direction angle (degree) and surface luminance intensity (cd/m²) Measurement positions (mm) | | | | | | Half value width (degree) |
|---|---|---|---|---|---|---|---|
| | 30 | | 70 | | 110 | | |
| | Angle | Intensity | Angle | Intensity | Angle | Intensity | |
| Comparison 13 | 61 | 428 | 62 | 237 | 64 | 182 | 45 |
| Comparison 14 | 4 | 362 | 4 | 227 | 2 | 195 | 49 |

TABLE 8

| | Incidence angle | Outgoing angle | Again outgoing light amount/ incident light amount (%) | |
|---|---|---|---|---|
| | (degrees) | (degrees) | 15-degree range | 1-degree range |
| Embodiment 9 | 8 | 10.5 | 76.3 | 75.2 |
| Embodiment 14 | 8 | 10.5 | 75.5 | 74.1 |
| Embodiment 15 | 9 | 11.5 | 77.1 | 74.2 |
| Embodiment 16 | 12 | 14.2 | 74.2 | 70.6 |
| Comparison 7 | 7 | — | less than 1 | less than 1 |
| Comparison 10 | 4 | 4 | 8.0 | 1.2 |
| Comparison 11 | 3 | — | less than 1 | less than 1 |
| Comparison 12 | 9 | 24.5 | 48.2 | 43.5 |
| Comparison 13 | 62 | 58 | 37.3 | 11.8 |
| Comparison 14 | 4 | 55 | 20.6 | 6.0 |

TABLE 9

| | Tilt Direction (degree) | Measurement positions (mm) and surface luminance intensity at the positions (cd/m²) | | | | |
|---|---|---|---|---|---|---|
| | | 10 | 40 | 70 | 100 | 130 |
| Embodiment 17 | −30 | 170 | 102 | 58 | 41 | 23 |
| | Perpendicular | 821 | 824 | 631 | 427 | 240 |
| | 30 | 1020 | 801 | 291 | 94 | 49 |
| Embodiment 18 | −30 | 262 | 178 | 101 | 54 | 35 |
| | Perpendicular | 862 | 794 | 559 | 344 | 217 |
| | 30 | 1000 | 781 | 309 | 82 | 64 |
| Embodiment 19 | −30 | 95 | 48 | 27 | 24 | 19 |
| | Perpendicular | 917 | 760 | 592 | 479 | 370 |
| | 30 | 564 | 349 | 190 | 82 | 66 |
| Embodiment 20 | −30 | 147 | 54 | 26 | 13 | 10 |
| | Perpendicular | 1100 | 949 | 818 | 732 | 577 |
| | 30 | 567 | 204 | 141 | 40 | 23 |

TABLE 10

| | Tilt Direction (degree) | Measurement positions (mm) and surface luminance intensity at the positions (cd/m²) | | | | |
|---|---|---|---|---|---|---|
| | | 10 | 40 | 70 | 100 | 130 |
| Embodiment 21 | −30 | 281 | 185 | 87 | 47 | 33 |
| | Perpendicular | 840 | 730 | 531 | 358 | 201 |
| | 30 | 888 | 611 | 272 | 96 | 74 |
| Comparison 15 | −30 | 215 | 47 | 12 | 6 | 3 |
| | Perpendicular | 558 | 123 | 36 | 21 | 10 |
| | 30 | 99 | 39 | 10 | 4 | 3 |
| Comparison 16 | −30 | 247 | 69 | 12 | 4 | 4 |
| | Perpendicular | 424 | 104 | 28 | 15 | 7 |
| | 30 | 111 | 34 | 15 | 4 | 3 |

TABLE 11

| | Tilt Direction (degree) | Measurement positions (mm) and surface luminance intensity at the positions (cd/m²) | | | | |
|---|---|---|---|---|---|---|
| | | 10 | 40 | 70 | 100 | 130 |
| Comparison 17 | −30 | 175 | 107 | 32 | 32 | 20 |
| | Perpendicular | 490 | 448 | 148 | 148 | 52 |
| | 30 | 572 | 421 | 50 | 50 | 36 |
| Comparison 18 | −30 | 12 | 10 | 8 | 7 | 4 |
| | Perpendicular | 74 | 35 | 26 | 19 | 12 |
| | 30 | 118 | 91 | 53 | 34 | 22 |
| Comparison 19 | −30 | 207 | 101 | 73 | 51 | 25 |
| | Perpendicular | 411 | 218 | 116 | 83 | 59 |
| | 30 | 251 | 162 | 93 | 60 | 45 |

TABLE 12

Maximum luminance intensity direction angle (degree) and surface luminance intensity (cd/m2) and light amount ratio

| | Measurement positions (mm) | | | | | | | | |
|---|---|---|---|---|---|---|---|---|---|
| | 30 | | | 70 | | | 110 | | |
| | Angle | Intensity | Light amount ratio | Angle | Intensity | Light amount ratio | Angle | Intensity | Light amount ratio |
| Embodiment 22 | 7 | 1332 | 1.47 | 8 | 614 | 1.49 | 14 | 336 | 1.52 |
| Embodiment 23 | 5 | 1011 | 1.47 | 8 | 589 | 1.48 | 15 | 343 | 1.51 |
| Embodiment 24 | 9 | 1160 | 1.46 | 9 | 562 | 1.45 | 16 | 357 | 1.47 |
| Embodiment 25 | 13 | 961 | 1.32 | 10 | 796 | 1.38 | 7 | 682 | 1.49 |
| Embodiment 26 | 15 | 951 | 1.43 | 12 | 588 | 1.48 | 11 | 299 | 1.49 |
| Comparison 20 | 9 | 369 | 1.11 | 8 | 51 | 0.94 | 5 | 4 | 1.00 |
| Comparison 21 | −2 | 225 | 1.43 | 1 | 130 | 1.34 | 3 | 84 | 1.36 |
| Comparison 22 | 0 | 273 | 1.03 | −2 | 172 | 1.12 | 1 | 99 | 1.09 |

TABLE 13

Maximum luminance intensity direction angle (degree) and surface luminance intensity (cd/m2) and light amount ratio

| | Measurement positions (mm) | | | | | | | | |
|---|---|---|---|---|---|---|---|---|---|
| | 30 | | | 70 | | | 110 | | |
| | Angle | Intensity | Light amount ratio | Angle | Intensity | Light amount ratio | Angle | Intensity | Light amount ratio |
| Comparison 23 | 7 | 927 | 1.00 | 9 | 244 | 1.03 | 8 | 145 | 1.02 |
| Comparison 24 | 59 | 484 | 1.13 | 57 | 277 | 1.17 | 58 | 211 | 1.16 |
| Comparison 25 | 2 | 380 | 1.05 | 2 | 241 | 1.06 | 3 | 211 | 1.08 |

TABLE 14

| | Tilt Direction (degree) | Measurement positions (mm) and surface luminance intensity at the positions (cd/m²) | | |
|---|---|---|---|---|
| | | 30 | 70 | 110 |
| Embodiment 27 | −30 | 40 | 19 | 11 |
| | Perpendicular | 222 | 171 | 100 |
| | 30 | 205 | 66 | 19 |
| Embodiment 28 | −30 | 67 | 31 | 17 |
| | Perpendicular | 220 | 149 | 80 |
| | 30 | 201 | 70 | 15 |
| Embodiment 29 | −30 | 26 | 10 | 6 |
| | Perpendicular | 254 | 179 | 124 |
| | 30 | 114 | 55 | 19 |
| Embodiment 30 | −30 | 27 | 9 | 4 |
| | Perpendicular | 259 | 211 | 170 |
| | 30 | 84 | 35 | 9 |

TABLE 15

| | Tilt Direction (degree) | Measurement positions (mm) and surface luminance intensity at the positions (cd/m²) | | |
|---|---|---|---|---|
| | | 30 | 70 | 110 |
| Embodiment 31 | −30 | 74 | 28 | 15 |
| | Perpendicular | 211 | 141 | 83 |
| | 30 | 166 | 64 | 21 |
| Comparison 26 | −30 | 50 | 7 | 2 |
| | Perpendicular | 107 | 13 | 7 |
| | 30 | 28 | 5 | 2 |
| Comparison 27 | −30 | 63 | 7 | 3 |
| | Perpendicular | 100 | 17 | 4 |
| | 30 | 26 | 7 | 2 |

TABLE 16

| | Tilt Direction (degree) | Measurement positions (mm) and surface luminance intensity at the positions (cd/m²) | | |
|---|---|---|---|---|
| | | 30 | 70 | 110 |
| Comparison 28 | −30 | 61 | 30 | 15 |
| | Perpendicular | 229 | 165 | 55 |
| | 30 | 200 | 74 | 16 |
| Comparison 29 | −30 | 5 | 3 | 2 |
| | Perpendicular | 18 | 7 | 6 |
| | 30 | 45 | 25 | 13 |
| Comparison 30 | −30 | 49 | 28 | 17 |
| | Perpendicular | 122 | 53 | 31 |
| | 30 | 77 | 33 | 22 |

TABLE 17

| | Tilt Direction (degree) | Measurement positions (mm) and surface luminance intensity at the positions (cd/m²) | | |
|---|---|---|---|---|
| | | 30 | 70 | 110 |
| Embodiment 32 | −30 | 48 | 70 | 15 |
| | Perpendicular | 311 | 239 | 136 |
| | 30 | 339 | 110 | 31 |
| Embodiment 33 | −30 | 81 | 42 | 20 |
| | Perpendicular | 309 | 212 | 113 |
| | 30 | 321 | 118 | 27 |
| Embodiment 34 | −30 | 26 | 11 | 9 |
| | Perpendicular | 305 | 223 | 170 |
| | 30 | 166 | 74 | 31 |
| Embodiment 35 | −30 | 32 | 9 | 5 |
| | Perpendicular | 391 | 317 | 258 |
| | 30 | 127 | 53 | 13 |

TABLE 18

| | Tilt Direction (degree) | Measurement positions (mm) and surface luminance intensity at the positions (cd/m²) | | |
|---|---|---|---|---|
| | | 30 | 70 | 110 |
| Embodiment 36 | −30 | 84 | 33 | 19 |
| | Perpendicular | 301 | 208 | 109 |
| | 30 | 270 | 102 | 33 |
| Comparison 31 | −30 | 39 | 5 | 2 |
| | Perpendicular | 100 | 13 | 7 |
| | 30 | 22 | 3 | 1 |
| Comparison 32 | −30 | 51 | 4 | 3 |
| | Perpendicular | 84 | 11 | 4 |
| | 30 | 21 | 5 | 1 |

TABLE 19

| | Tilt Direction (degree) | Measurement positions (mm) and surface luminance intensity at the positions (cd/m²) | | |
|---|---|---|---|---|
| | | 30 | 70 | 110 |
| Comparison 33 | −30 | 50 | 12 | 10 |
| | Perpendicular | 184 | 56 | 45 |
| | 30 | 188 | 19 | 17 |
| Comparison 34 | −30 | 4 | 3 | 2 |
| | Perpendicular | 19 | 10 | 7 |
| | 30 | 37 | 20 | 9 |
| Comparison 35 | −30 | 50 | 26 | 15 |
| | Perpendicular | 105 | 43 | 29 |
| | 30 | 69 | 32 | 17 |

TABLE 20

Maximum luminance intensity direction angle (degree) and surface luminance intensity (cd/m2)

| | Measurement positions (mm) | | | | | |
|---|---|---|---|---|---|---|
| | 30 | | 70 | | 110 | |
| | Angle | Intensity | Angle | Intensity | Angle | Intensity |
| Embodiment 37 | 5 | 326 | 8 | 187 | 12 | 103 |
| Embodiment 38 | 4 | 282 | 7 | 155 | 13 | 89 |
| Embodiment 39 | 7 | 286 | 8 | 149 | 15 | 96 |
| Embodiment 40 | 11 | 257 | 9 | 204 | 7 | 179 |
| Comparison 36 | 10 | 91 | 7 | 10 | 6 | 2 |
| Comparison 37 | 0 | 51 | 4 | 31 | 2 | 19 |
| Comparison 38 | −1 | 66 | 3 | 41 | 2 | 24 |
| Comparison 39 | 5 | 244 | 9 | 57 | 7 | 35 |
| Comparison 40 | 57 | 118 | 57 | 68 | 56 | 50 |

TABLE 21

Maximum luminance intensity direction angle (degree) and surface luminance intensity (cd/m²)
Measurement positions (mm)

| | 30 | | 70 | | 110 | |
|---|---|---|---|---|---|---|
| | Angle | Intensity | Angle | Intensity | Angle | Intensity |
| Comparison 41 | −1 | 92 | 2 | 58 | 0 | 49 |

What is claimed is:
1. A light guide plate comprising:
an outgoing radiation plane;
a bottom opposed to said outgoing radiation plane; and an incidence plane disposed between said outgoing radiation plane and said bottom;

wherein said bottom comprises projections or recesses at a regular interval which are formed of slopes parallel to the longitudinal direction of said incidence plane, the projections or recesses have long-side and short-side faces, an projection area of the long-side face on said outgoing radiation plane is three times or more that of said short-side face on said outgoing radiation plane, the long-side face is a projection, the long-side face is placed on the incidence plane side in the case of projections, the long-side face is placed on a side opposed to said incidence plane in the case of recesses.

2. The light guide plate as claimed in claim 1, wherein a side end opposed to said incidence plane is thinner than said incidence plane.

3. The light guide plate as claimed in claim 2, wherein said side end opposed to said incidence plane has a thickness of 50% or less of that of said incidence plane.

4. The light guide plate as claimed in claim 1, wherein the projections or recesses are formed at intervals of 500 µm or less.

5. The light guide plate as claimed in claim 1, wherein a tilt angle of said long-side face to said outgoing radiation plane is 0.01 to 10 degrees.

6. The light guide plate as claimed in claim 1, wherein a tilt angle of said short-side face to said outgoing radiation plane is 25 to 50 degrees.

7. The light guide plate as claimed in claim 1, wherein the projection area of said long-side face on said outgoing radiation plane is five times or more that of said short-side face on said outgoing radiation plane.

8. The light guide plate as claimed in claim 1, wherein the projection area of said long-side face on said outgoing radiation plane is ten times or more that of said short-side face on said outgoing radiation plane.

9. The light guide plate as claimed in claim 1, wherein said bottom is curved.

10. The light guide plate as claimed in claim 1, wherein one or both of said long-side and short-side faces is curved.

11. The light guide plate as claimed in claim 1, further comprising a reflection layer laminated on said bottom thereof.

12. The light guide plate as claimed in claim 11, wherein said reflection layer is made of a metal reflection layer containing at least one of aluminum, silver, gold, copper and chromium.

13. The light guide plate as claimed in claim 1, wherein a half value width of a luminous flux angle of initial outgoing light from said outgoing radiation plane, of light incident from said incidence plane is within 60 degrees, and when parallel light progressing to the same direction as a direction in which light in a direction showing the maximum outgoing light amount of the initial outgoing light is reflected by a plane mirror placed in parallel on said outgoing radiation plane, is allowed to be incident from said outgoing radiation plane, an angle shift between a direction of the maximum luminous flux amount of again outgoing light comprising return light of the incident light of the parallel light to said outgoing radiation plane and a direction of the maximum luminous flux amount of the initial outgoing light is within 20 degrees, and 67% or more of the luminous flux amount of the again outgoing light is within cubic half angle 15 degrees relative to the direction of the maximum luminous flux amount of the initial outgoing light.

14. The light guide plate as claimed in claim 13, wherein the initial outgoing light is allowed to go out mainly via short-side faces and the again outgoing light is allowed to go out mainly via long-side faces, and the half value width of the luminous flux angle of the initial outgoing light is within 30 degrees, and wherein the angle shift between the direction of the maximum luminous flux amount of the again outgoing light and that of the initial outgoing light is within 10 degrees.

15. The light guide plate as claimed in claim 13, wherein the direction of the maximum luminous flux amount of the initial outgoing light is within a range of ±30 degrees with respect to a direction of the normal to said outgoing radiation plane.

16. A surface light source device comprising:

a light guide plate including:

an outgoing radiation plane;

a bottom opposed to said outgoing radiation plane; and an incidence plane disposed between said outgoing radiation plane and said bottom;

wherein projections or recesses are formed on said bottom along the progress direction of incident light at a regular interval, the projections or recesses have long-side and short-side faces, an projection area of the long-side face on said outgoing radiation plane is three times or more that of said short-side face on said outgoing radiation plane, the long-side face is a projection, the long-side face is placed on the incidence plane side in the case of projections, the long-side face is placed on a side opposed to said incidence plane in the case of recesses; and a light source faced placed facing said incidence plane.

17. The surface light source device as claimed in claim 16, further comprising a reflection plate disposed on said bottom of said light guide plate.

18. The surface light source device as claimed in claim 17, wherein said reflection plate has a metal reflection face.

19. The surface light source device as claimed in claim 17, wherein a half angle of a half value width of spread of a reflection angle of reflected light when said reflection plate allows parallel light to be incident is within 10 degrees.

20. The surface light source device as claimed in claim 19, wherein the half angle of the half value width of spread of the reflection angle of reflected light when said reflection plate allows parallel light to be incident is within 5 degrees.

21. The surface light source device as claimed in claim 16, further comprising a light holder surrounding said light source.

22. The surface light source device as claimed in claim 16, further comprising a diffusion layer placed on said outgoing radiation plane.

23. A polarized light source device comprising:

a light guide plate including:

an outgoing radiation plane;

a bottom opposed to said outgoing radiation plane; and an incidence plane disposed between said outgoing radiation plane and said bottom;

wherein projections or recesses are formed on said bottom along the progress direction of incident light at a regular interval, the projections or recesses have long-side and short-side faces, an projection area of the long-side face on said outgoing radiation plane is three times or more that of said short-side face on said outgoing radiation plane, the long-side face is a projection, the long-side face is placed on the incidence plane side in the case of projections, the long-side face is placed on a side opposed to said incidence plane in the case of recesses;

a light source faced placed facing said incidence plane; and polarized light separation means placed on said outgoing radiation plane for transmission and reflection.

24. The polarized light source device as claimed in claim 23, wherein said polarized light separation means has a cholesteric liquid crystal phase for selectively separating circularly polarized light.

25. The polarized light source device as claimed in claim 24, wherein a layer indicating the cholesteric liquid crystal phase is made of a liquid crystal polymer.

26. The polarized light source device as claimed in any of claims 23, further comprising linearly polarized light conversion means disposed on said polarized light separation means.

27. The polarized light source device as claimed in claim 26, wherein said linearly polarized light conversion means is a phase difference layer.

28. The polarized light source device as claimed in claim 27, wherein said phase difference layer is one of a single layer of a phase difference plate and a laminate of said phase difference plate, and one or more of said phase difference plates give a phase difference of 100 to 200 nm.

29. A liquid crystal display comprising:

a light guide plate including:

an outgoing radiation plane;

a bottom opposed to said outgoing radiation plane; and an incidence plane disposed between said outgoing radiation plane and said bottom;

wherein projections or recesses are formed on said bottom along the progress direction of incident light at a regular interval, the projections or recesses have long-side and short-side faces, an projection area of the long-side face on said outgoing radiation plane is three times or more that of said short-side face on said outgoing radiation plane, the long-side face is a projection, the long-side face is placed on the incidence plane side in the case of projections, the long-side face is placed on a side opposed to said incidence plane in the case of recesses;

a light source faced placed facing said incidence plane; and a liquid crystal cell.

* * * * *